United States Patent
Kriegel et al.

(10) Patent No.: US 9,764,872 B2
(45) Date of Patent: Sep. 19, 2017

(54) GAS BARRIER ENHANCING ADDITIVES AND METHODS

(71) Applicants: The Coca-Cola Company, Atlanta, GA (US); CSPC Innovation Pharmaceutical Co., Ltd., Shijizhauang (CN)

(72) Inventors: Robert Kriegel, Decatur, GA (US); Liu Hui, Shijiazhuang (CN)

(73) Assignees: The Coca-Cola Company, Atlanta, GA (US); CSPC Innovation Pharmaceutical Co., Ltd. (CN)

( * ) Notice: Subject to any disclaimer, the term of this patent is extended or adjusted under 35 U.S.C. 154(b) by 6 days.

(21) Appl. No.: 14/776,108

(22) PCT Filed: Mar. 14, 2014

(86) PCT No.: PCT/US2014/027734
§ 371 (c)(1),
(2) Date: Sep. 14, 2015

(87) PCT Pub. No.: WO2014/152788
PCT Pub. Date: Sep. 25, 2014

(65) Prior Publication Data
US 2016/0031583 A1     Feb. 4, 2016

Related U.S. Application Data

(60) Provisional application No. 61/783,055, filed on Mar. 14, 2013.

(51) Int. Cl.
*B29D 22/00*     (2006.01)
*B65D 1/02*      (2006.01)
(Continued)

(52) U.S. Cl.
CPC ............ *B65D 1/0207* (2013.01); *B29B 11/14* (2013.01); *B29C 49/22* (2013.01); *C08K 5/3462* (2013.01);
(Continued)

(58) Field of Classification Search
CPC .. B65D 1/0207; B65D 1/0215; C08K 5/3467; B29C 49/22; B29C 49/06;
(Continued)

(56) References Cited

U.S. PATENT DOCUMENTS

| 6,090,811 A | 7/2000 | Jacobs et al. |
| 2007/0082156 A1* | 4/2007 | Shi .................. B65D 1/0207 428/35.7 |
| 2008/0113134 A1 | 5/2008 | Shi et al. |

FOREIGN PATENT DOCUMENTS

| JP | 2009/107939 | 5/2009 |
| WO | WO 2011/142668 | 11/2011 |

OTHER PUBLICATIONS

International Search Report for PCT/US2014/027734, mailed Jul. 21, 2014.

\* cited by examiner

*Primary Examiner* — Ruiyun Zhang
(74) *Attorney, Agent, or Firm* — King & Spalding

(57) ABSTRACT

Polyesters compositions comprising gas barrier enhancing additives and containers comprising such polyester compositions are provided herein. Also provided are methods for preparing polyester containers comprising said gas barrier enhancing additives. The polyester containers of the present invention exhibit decreased permeability to gases thereby providing improved shelf-life.

15 Claims, 5 Drawing Sheets

(51) Int. Cl.
*B29B 11/14* (2006.01)
*B29C 49/22* (2006.01)
*C08K 5/3462* (2006.01)
*C08K 5/3465* (2006.01)
*B29K 105/00* (2006.01)
*B29C 49/06* (2006.01)
*B29K 67/00* (2006.01)
*B29L 9/00* (2006.01)
*B29L 31/00* (2006.01)

(52) U.S. Cl.
CPC ..... *C08K 5/3465* (2013.01); *B29B 2911/1402* (2013.01); *B29B 2911/1404* (2013.01); *B29B 2911/14026* (2013.01); *B29B 2911/14033* (2013.01); *B29B 2911/14326* (2013.01); *B29B 2911/14333* (2013.01); *B29C 49/06* (2013.01); *B29K 2067/003* (2013.01); *B29K 2105/258* (2013.01); *B29K 2995/0067* (2013.01); *B29K 2995/0069* (2013.01); *B29L 2009/00* (2013.01); *B29L 2031/7158* (2013.01); *C08K 2201/008* (2013.01)

(58) Field of Classification Search
CPC .... B29K 2995/0069; B29K 2995/0067; B29K 2067/003; B29B 2911/14013; B29B 2911/14046; B29L 2009/00; B29L 2031/7158
USPC ...... 428/35.7, 36.6, 36.7, 36.91, 36.92, 480; 264/523; 426/112; 524/91, 106
See application file for complete search history.

Mass loss curves of PET bottle resin (1101) at temperatures of 120 to 180 °C.

GAS BARRIER ENHANCING ADDITIVES AND METHODS

CROSS REFERENCE TO RELATED APPLICATIONS

This application is a national phase application under 35 U.S.C. §371 of International Application No. PCT/US2014/027734, filed on 14 Mar. 2014, which claims the benefit of U.S. Provisional Application No. 61/783,055, filed on Mar. 14, 2013, the disclosures of both of which are incorporated herein by reference.

FIELD OF THE INVENTION

This invention relates to a polyester container having enhanced gas barrier properties as well as to a method of making a polyester container having enhanced gas barrier properties.

BACKGROUND

Polyethylene terephthalate and polyethylene terephthalate copolymers (hereinafter referred to collectively as "PET") are widely used to make containers for carbonated soft drinks, juice, water, and the like due to their excellent combination of clarity, mechanical, and gas barrier properties. In spite of these desirable characteristics, oxygen and carbon dioxide gas barrier properties of PET limit application of PET for smaller sized packages, as well as for packaging oxygen sensitive products, such as beer, juice, and tea products. A widely expressed need exists in the packaging industry to further improve the gas barrier properties of PET.

The relatively high permeability of PET to carbon dioxide limits the use of smaller PET containers for packaging carbonated soft drinks. The permeation rate of carbon dioxide through PET containers is in the range of 3 to 14 cc's per day or 1.5 to 2 percent per week at room temperature depending on the size of the container. A smaller container has a larger surface area to volume ratio resulting in a higher relative loss rate. For this reason, PET is currently only used to make larger containers for packaging carbonated soft drinks, while metal and glass containers are the preferred materials for making smaller carbonated soft drink containers.

The amount of carbon dioxide remaining in a packaged carbonated soft drink determines its shelf life. Normally, carbonated soft drink containers are filled with approximately four volumes of carbon dioxide per volume of water. It is generally accepted that a packaged carbonated soft drink reaches the end of its shelf life when 17.5 percent of the carbon dioxide in the container is lost due to permeation of the carbon dioxide through the container side wall and closure. The permeability of PET to carbon dioxide therefore determines the shelf life of the packaged carbonated beverage and thus, the suitability of PET as a packaging material.

Numerous technologies have been developed or are being developed to enhance the barrier of PET to small gas molecules, such as carbon dioxide. For example, the use of a high barrier layer either as a coating or sandwiched between two layers of PET. The adoption of a barrier layer adds considerable expense to the manufacturing process, impact the container's mechanical performance and—in the case of a coating layer—and also impact the container's appearance.

Barrier additives eliminate the manufacturing complexity and cost associated with a separate barrier layer. Yet, many known additives provide only modest barrier improvement while causing undesirable changes in PET, including the material's mechanical properties, stretch ratio, and/or clarity.

U.S. Pat. No. 7,820,258 discloses a polyester container with enhanced gas barrier properties. The polyester container is formed from a polyester composition comprising a polyester and a purine derivative. In one embodiment, the purine derivative is a purine dione, such as caffeine.

There remains a need to enhance the barrier performance of polyester containers, such as PET containers, for use in applications that will require an enhanced barrier, such as in the packaging of carbonated beverages and oxygen sensitive beverages and foods, in an economical manner that meets safety, performance and recyclability requirements.

SUMMARY OF THE INVENTION

The present invention is directed to a polyester composition comprising a polyester and a gas barrier enhancing additive. Polyester containers comprising the polyester composition comprising a polyester and a gas barrier additive are also provided. In one embodiment, the gas barrier additive is a compound of Formula I.

In an embodiment, the present invention is a polyester container having enhanced gas barrier properties comprising a polyester composition comprising a polyester and a gas barrier enhancing additive, wherein the gas barrier enhancing additive is a compound of Formula I:

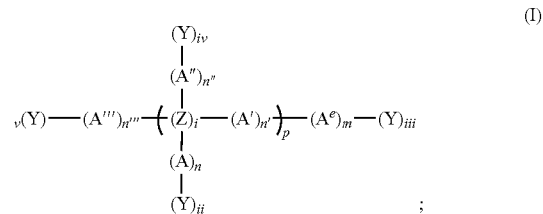

wherein i, ii, iii, iv, v, n, n', n", n''', and m are 0 or 1;
wherein p is an integer from 0 to 50;
wherein Z is a carbon or nitrogen atom;
wherein A, A', A", A''', and $A^e$ are selected from the group consisting of hydrogen, hydroxyl, primary amine, secondary amine, and unsubstituted or substituted $C_1$-$C_{20}$ hydrocarbyl, wherein the $C_1$-$C_{20}$ hydrocarbyl is mono-, di-, tri-, or tetravalent;
wherein each Y, independent of one another, is a compound having the chemical structure of Formula II:

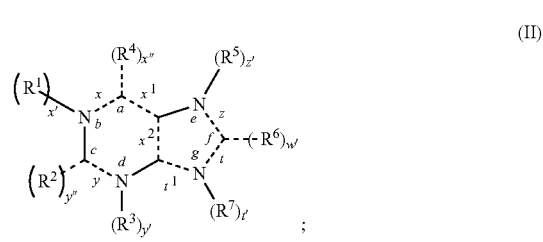

wherein t, $t^1$, x, $x^1$, $x^2$, y, and z, independent of one another, are a single bond or a double bond; wherein t', x', y', and z', independent of one another, are 0 or 1; wherein x", y", and w', independent of one another, are 0, 1 or 2;

wherein when one or more of ii, iii, iv, and v are 1, A, A' (or $A^e$), A", and A'", respectively and independent of one other, is singly or doubly bonded to atom a, c, or f in structure Y, or singly bonded to atom b, d, e, or g in structure Y;

wherein when one or more of A, A', A", A'", and $A^e$, independent of one another, is singly bonded to atom b in structure Y, x' is 0, and x is a single bond;

wherein when one or more of A, A', A", A'", and $A^e$, independent of one another, is singly bonded to atom c in structure Y, y" is 1 and y is a single bond, or y" is 0 and y is a double bond; wherein when one or more of A, A', A", A'", and $A^e$, independent of one another, is doubly bonded to atom c in structure Y, y" is 0 and y is a single bond;

wherein when one or more of A, A', A", A'", and $A^e$, independent of one another, is singly bonded to atom d in structure Y, y' is 0 and y is a single bond;

wherein when one or more of A, A', A", A'", and $A^e$, independent of one another, is singly bonded to atom a in structure Y, x" is 1 and both x and $x^1$ are single bonds, or x" is 0 and one of x and $x^1$ is a double bond; wherein when one or more of A, A', A", A'", and $A^e$, independent of one another, is doubly bonded to atom a in structure Y, x" is 0 and both x and $x^1$ are single bonds;

wherein when one or more of A, A', A", A'", and $A^e$, independent of one another, is singly bonded to atom e in structure Y, z' is 0 and z is a single bond;

wherein when one or more of A, A', A", A'", and $A^e$, independent of one another, is singly bonded to atom f in structure Y, w' is 1 and both z and t are single bonds, or w' is 0 and one of z and t is a double bond; wherein when one or more of A, A', A", A'", and $A^e$, independent of one another, is doubly bonded to atom f in structure Y, w' is 0 and both z and t are single bonds;

wherein when one or more of A, A', A", A'", and $A^e$, independent of one another, is singly bonded to atom g in structure Y, t' is 0 and both t and $t^1$ are single bonds;

wherein when x is a double bond, $x^1$ is a single bond; wherein when $x^1$ is a double bond, x and $x^2$ are single bonds; wherein when $x^2$ is a double bond, $x^1$ and $t^1$ are single bonds; wherein when t is a double bond, $t^1$ and z are single bonds; wherein when z is a double bond, t is a single bond; wherein when $t^1$ is a double bond, t and $x_2$ are single bonds; wherein when x is a double bond, x' is 0; wherein when x or $x^1$ is a double bond, x" is 1 if one or more of A, A', A", A'", or $A^e$, independent of one another, is not singly bonded to atom a in structure Y; wherein when y is a double bond, y' is 0 and y" is 1 if one or more of A, A', A", A'", or $A^e$, independent of one another, is not singly bonded to atom c in structure Y; wherein when t or $t^1$ is a double bond, t' is 0; wherein when z and t are single bonds, w' is 2 if one or more of A, A', A", A'", or $A^e$, independent of one another, is not singly bonded to atom f in structure Y; wherein when z or t is a double bond, w' is 1 if one or more of A, A', A", A'", or $A^e$, independent of one another, is not singly bonded to atom f in structure Y; wherein when z is a double bond, z' is 0; wherein when x, y, or z, independent of one another, is a single bond and one or more of A, A', A", A'", or $A^e$, independent of one another, is not singly bonded to atoms b, d, or e, respectively, in structure Y, x', y', or z', independent of one another, is 1;

wherein $R^1$, $R^3$, $R^5$, and $R^7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein $R^2$, $R^4$, and $R^6$, independent of one another, may be moieties attached by a single or double bond;

wherein when $R^2$, $R^4$, or $R^6$ is a moiety attached by a single bond, $R^2$, $R^4$, and $R^6$, independent of one another, is hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R^2$, $R^4$, or $R^6$ is a moiety attached by a double bond, $R^2$, $R^4$, or $R^6$, independent of one another, is oxygen, sulfur, $CR^8R^9$, $SO_2$, $N^{10}$; wherein $R^8$ and $R^9$, independent of one another, is hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R^{10}$ is hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein when x" is 2, both $R^4$ moieties may be the same or different; wherein when y" is 2, both $R^2$ moieties may be the same or different; and wherein when w' is 2, both $R^6$ moieties may be the same or different.

According to another embodiment, the present invention is a method for making a polyester container having enhanced gas barrier properties comprising blending a polyester with a gas barrier enhancing additive to form a polyester composition and forming the polyester composition into a container. In one embodiment, the step of forming the container comprises stretch blow molding.

In a particular embodiment, the polyester is poly(ethylene terethphalate) based copolymer (PET copolymer).

The polyester containers of the present invention exhibit improved properties compared to conventional polyester containers. In one embodiment, the polyester container of the present invention exhibits a desirable barrier improvement factor (BIF). In another embodiment, the polyester container of the present invention exhibits improvement in shelf-life in comparison to a standard polyester container. In yet another embodiment, the polyester container of the present invention exhibits improved gas barrier properties for oxygen, carbon dioxide or both oxygen and carbon dioxide. In still another embodiment, the polyester container of the present invention exhibits a loss rate reduced by a factor of 0.95 over a standard polyester bottle. In a further embodiment, the shelf-life of the polyester container of the present invention is from about 10 weeks to 20 weeks.

In one particular embodiment, the polyester container of the present invention is a food or beverage container.

In a particular embodiment, the polyester container is a carbonated soft drink container, an oxygen-sensitive beverage container or an oxygen-sensitive food container.

Particular embodiments may achieve this enhanced gas barrier while offering safety, performance and recyclability.

Other objects, features, and advantages of this invention will become apparent from the following detailed description, drawings, and claims.

DETAILED DESCRIPTION

Figure 1:
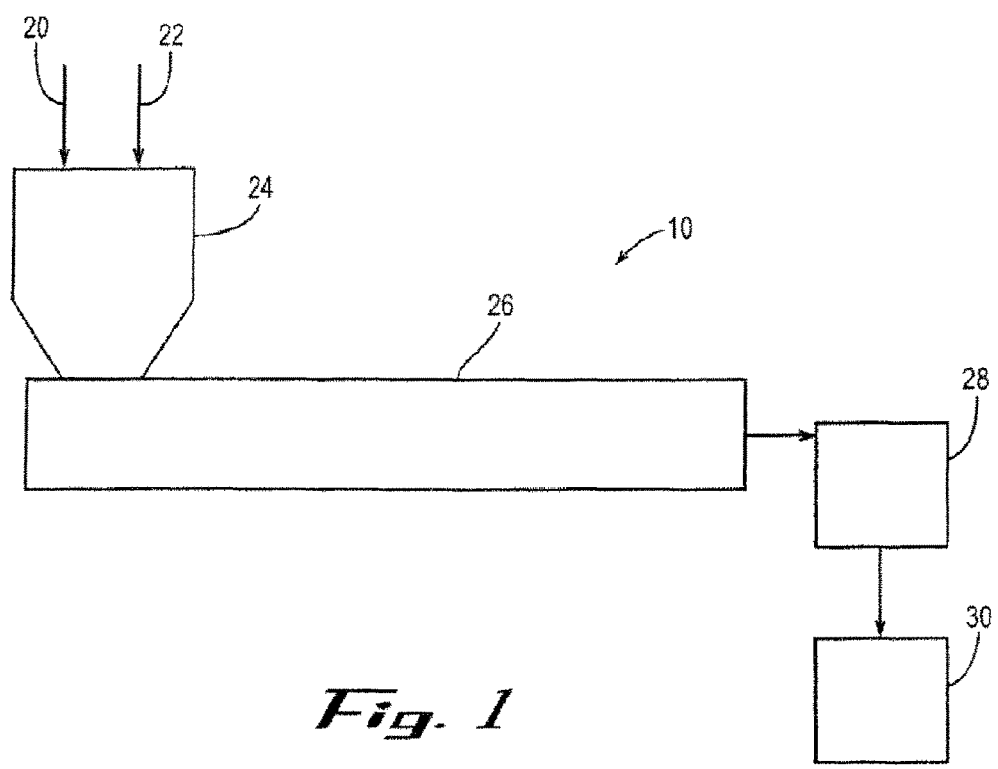
FIG. 1 is a schematic diagram of a system for making a polyester container such as a PET container with enhanced gas barrier in accordance with an embodiment of the present invention.

This invention relates to a polyester composition comprising a polyester and a gas barrier enhancing additive. Polyester containers comprising the polyester composition comprising a polyester and a gas barrier additive, and methods for making such containers, are further described below and in the accompanying figures.

I. Polyester

The polyester may be any suitable polyester. The polyester may be a homopolymer or a copolymer, partially or wholly derived from petrochemicals or partially or wholly derived from biomass. In a particular embodiment, the polyester is suitable for use in the manufacture of containers. Suitable polyesters for use in the present invention include, but are not limited to, polyethylene terephthalate (PET), PET copolymers, PET blends, polyethylene naphthalate (PEN), polyethylene isophthalate, nylons, aliphatic polyesters (e.g. poly(hydroxyalkanoic acids and poly(lactic acid)) and the like.

In a particular embodiment, the polyester is PET. PET comprises a diol component having repeat units of ethylene glycol and a diacid component having repeat units of terephthalic acid. PET is commonly used for many applications where a barrier is desirable, such as films and containers. In particular, PET containers are widely used for packaging beverages including carbonated soft drinks.

In another particular embodiment, the polyester is a PET copolymer. PET copolymers comprise repeating units of ethylene glycol and terephthalic acid, as above, in addition to another monomer. Like PET, PET copolymers are commonly used for many applications where a barrier is desirable, such as films and containers. In particular, PET copolymer containers are widely used for packaging beverages including carbonated soft drinks.

In a particular embodiment, the present invention is a polyester composition comprising a polyester and a gas barrier enhancing additive, as described further below. Without being bound by any particular theory, it is believed that the gas barrier enhancing additive is truly solubilized in PET.

The weight percentage of the gas barrier enhancing additive relative to the polyester composition is referred to as the loading level. In a specific embodiment, the loading level of the gas barrier enhancing additive is desirably in the range of about 0.1 to about 40 weight percent of the polyester composition, such as, for example, from about 1 to about 10 weight percent, from about 1 to about 5 weight percent, from about 2 to about 5 weight percent or from about 2 to about 3 weight percent. In a particular embodiment, the gas barrier enhancing additive is about 2 weight percent of the polyester composition. In a particular embodiment, the gas barrier additive is about 3 weight percent of the polyester composition.

According to one embodiment, the polyester composition comprises: a) a polyester, wherein the polyester is present in an amount in the range of about 60 to about 99.8 weight percent of the polyester composition; and b) a gas barrier enhancing additive, wherein the gas barrier enhancing additive is present in an amount in the range of about 0.2 to about 40 weight percent of the polyester composition. In a particular embodiment, the polyester is a PET copolymer.

According to one embodiment, the polyester is present in an amount in the range of about 70 to about 99.8 weight percent of the polyester composition, about 80 to about 99.8 weight percent of the polyester composition or about 90 to about 99.8 weight percent of the polyester composition.

In a particular embodiment, the polyester composition comprises: a) a polyester, wherein the polyester is present in an amount in the range of about 90 to about 99.8 weight percent of the polyester composition; and b) a gas barrier enhancing additive, wherein the gas barrier enhancing additive is in an amount in the range of about 0.2 to about 10 weight percent of the polyester composition. In some embodiments, the polyester composition comprises a polyester in an amount in the range of about 90 to about 99.8 weight percent and the remainder of the polyester composition comprises the gas barrier enhancing additive.

II. Gas Barrier Enhancing Additive

In one embodiment, the present invention is a polyester composition comprising a polyester and a gas permeation enhancing additive, wherein the gas barrier enhancing additive is a compound of Formula I. The compound of Formula 1 provides at least the following characteristics: (1) lower volatility; (2) decreased rate of migration of from the packaging into the product; and 3) multiple interactions that may offset some of the additional plasticization effects.

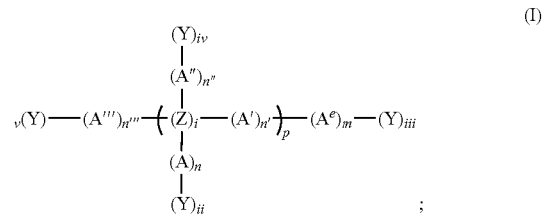

wherein i, ii, iii, iv, v, n, n', n'', n''', and m are 0 or 1;
wherein p is an integer from 0 to 50;
wherein Z is a carbon or nitrogen atom;
wherein A, A', A'', A''', and $A^e$ are selected from the group consisting of hydrogen, hydroxyl, primary amine, secondary amine, and unsubstituted or substituted $C_1$-$C_{20}$ hydrocarbyl, wherein the $C_1$-$C_{20}$ hydrocarbyl is mono-, di-, tri-, or tetravalent;

wherein each Y, independent of one another, is a compound having the chemical structure of Formula II:

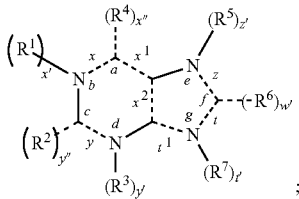
(II)

wherein t, $t^1$, x, $x^1$, $x^2$, y, and z, independent of one another, are a single bond or a double bond; wherein t', x', y', and z', independent of one another, are 0 or 1; wherein x", y", and w', independent of one another, are 0, 1 or 2;

wherein when one or more of ii, iii, iv, and v are 1, A, A' (or $A^e$), A", and A'", respectively and independent of one other, is singly or doubly bonded to atom a, c, or f in structure Y, or singly bonded to atom b, d, e, or g in structure Y;

wherein when one or more of A, A', A", A'", and $A^e$, independent of one another, is singly bonded to atom b in structure Y, x' is 0, and x is a single bond;

wherein when one or more of A, A', A", A'", and $A^e$, independent of one another, is singly bonded to atom c in structure Y, y" is 1 and y is a single bond, or y" is 0 and y is a double bond; wherein when one or more of A, A', A", A'", and $A^e$, independent of one another, is doubly bonded to atom c in structure Y, y" is 0 and y is a single bond;

wherein when one or more of A, A', A", A'", and $A^e$, independent of one another, is singly bonded to atom d in structure Y, y' is 0 and y is a single bond;

wherein when one or more of A, A', A", A'", and $A^e$, independent of one another, is singly bonded to atom a in structure Y, x" is 1 and both x and $x^1$ are single bonds, or x" is 0 and one of x and $x^1$ is a double bond; wherein when one or more of A, A', A", A'", and $A^e$, independent of one another, is doubly bonded to atom a in structure Y, x" is 0 and both x and $x^1$ are single bonds;

wherein when one or more of A, A', A", A'", and $A^e$, independent of one another, is singly bonded to atom e in structure Y, z' is 0 and z is a single bond;

wherein when one or more of A, A', A", A'", and $A^e$, independent of one another, is singly bonded to atom f in structure Y, w' is 1 and both z and t are single bonds, or w' is 0 and one of z and t is a double bond; wherein when one or more of A, A', A", A'", and $A^e$, independent of one another, is doubly bonded to atom f in structure Y, w' is 0 and both z and t are single bonds;

wherein when one or more of A, A', A", A'", and $A^e$, independent of one another, is singly bonded to atom g in structure Y, t' is 0 and both t and $t^1$ are single bonds;

wherein when x is a double bond, $x^1$ is a single bond; wherein when $x^1$ is a double bond, x and $x^2$ are single bonds; wherein when $x^2$ is a double bond, $x^1$ and $t^1$ are single bonds; wherein when t is a double bond, $t^1$ and z are single bonds; wherein when z is a double bond, t is a single bond; wherein when $t^1$ is a double bond, t and $x_2$ are single bonds; wherein when x is a double bond, x' is 0; wherein when x or $x^1$ is a double bond, x" is 1 if one or more of A, A', A", A'", or $A^e$, independent of one another, is not singly bonded to atom a in structure Y; wherein when y is a double bond, y' is 0 and y" is 1 if one or more of A, A', A", A'", or $A^e$, independent of one another, is not singly bonded to atom c in structure Y;

wherein when t or $t^1$ is a double bond, t' is 0; wherein when z and t are single bonds, w' is 2 if one or more of A, A', A", A'", or $A^e$, independent of one another, is not singly bonded to atom f in structure Y; wherein when z or t is a double bond, w' is 1 if one or more of A, A', A", A'", or $A^e$, independent of one another, is not singly bonded to atom f in structure Y; wherein when z is a double bond, z' is 0; wherein when x, y, or z, independent of one another, is a single bond and one or more of A, A', A", A'", or $A^e$, independent of one another, is not singly bonded to atoms b, d, or e, respectively, in structure Y, x', y', or z', independent of one another, is 1;

wherein $R^1$, $R^3$, $R^5$, and $R^7$, independent of one another, comprise a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein $R^2$, $R^4$, and $R^6$, independent of one another, may be moieties attached by a single or double bond;

wherein when $R^2$, $R^4$, or $R^6$ is a moiety attached by a single bond, $R^2$, $R^4$, and $R^6$, independent of one another, are a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group;

wherein when $R^2$, $R^4$, or $R^6$ is a moiety attached by a double bond, $R^2$, $R^4$, or $R^6$, independent of one another, are oxygen, sulfur, $CR^8R^9$, $SO_2$, $NR^{10}$; wherein $R^8$ and $R^9$, independent of one another, are a hydrogen, hydroxyl, amino, amido, alkylamino, arylamino, alkoxy, aryloxy, nitro, acyl, alkenyl, alkynyl, cyano, sulfo, sulfato, mercapto, imino, sulfonyl, sulfenyl, sulfinyl, sulfamoyl, phosphonyl, phosphinyl, phosphoryl, phosphino, thioester, thioether, anhydride, oximno, hydrazino, carbamyl, phosphonic acid, phosphonato, or a straight, chained, branched, or cyclic alkyl, alkenyl, alkynyl, aryl, heteroaryl, heterocyclic, or acyl group; and $R^{10}$ are a hydrogen, arylamino, alkoxy, aryloxy, alkenyl, alkynyl, or a straight, chained, branched, or cyclic alkyl, alkenyl, alkynyl, aryl, heteroaryl, heterocyclic, or acyl group;

wherein when x" is 2, both $R^4$ moieties may be the same or different; wherein when y" is 2, both $R^2$ moieties may be the same or different; and wherein when w' is 2, both $R^6$ moieties may be the same or different.

In some embodiments, the gas barrier enhancing additive is a compound having the chemical structure of Formula I, wherein n'" and p are 0. Therefore, in these embodiments, the gas barrier enhancing additive is a compound having the chemical structure of Formula Ia:

$$(Y)_v\text{-}(A^e)_m\text{-}(Y)_{iii} \qquad \text{(Formula Ia)}.$$

In the descriptions of Formula Ia that appear throughout this specification, $(Y)_v$ and $(Y)_{iii}$ are often referred to as "the first structure Y" and "the second structure Y," respectively.

In certain embodiments, the gas barrier enhancing additive is a compound having the chemical structure of Formula Ia, wherein v and m are 1, and, in these certain embodiments, $(A^e)$ may be singly or doubly bonded to atoms a, c, or f of $(Y)_v$, or singly bonded to atoms b, d, e, or g of $(Y)_v$. When, in these embodiments, $(A^e)$ is bonded to one of atoms a, b, c, d, e, f, or g, then x", x', y", y', z', w', or t', respectively, in $(Y)_v$ is 0. Similarly, in other certain embodiments, the purine derivative is a compound having the chemical structure of Formula Ia, wherein iii and m are 1, and, in these other certain embodiments, (A$^e$) may be singly or doubly bonded to atoms a, c, or f of (Y)$_{iii}$, or singly bonded to atoms b, d, e, or g of (Y)$_{iii}$. When, in these embodiments, (A$^e$) is bonded to one of atoms a, b, c, d, e, f, or g, then x", x', y", y', z', w', or t', respectively, in (Y)$_{iii}$, is 0.

Therefore, in some embodiments, the gas barrier enhancing additive is a compound having the chemical structure of Formula Ia, wherein m, v, and iii are 1. In these embodiments, the gas barrier enhancing additive of Formula Ia may have one of the following generic structures:

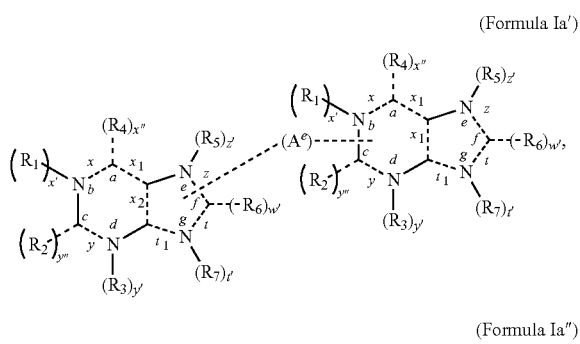

(Formula Ia')

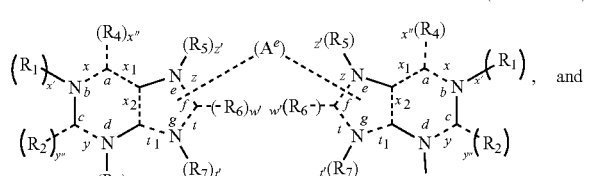

(Formula Ia")

and

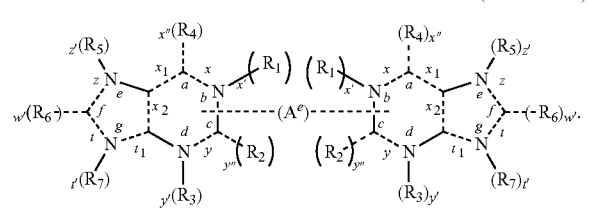

(Formula Ia''')

In one embodiment, the gas barrier enhancing additive is a compound having the chemical structure of Formula Ia', Formula Ia", or Formula Ia''', wherein A$^e$ is a $C_3$ hydrocarbyl. In one particular embodiment, the $C_3$ hydrocarbyl of A$^e$ in Formula Ia', Formula Ia", or Formula Ia''' is —($C_3H_6$)—, and the gas barrier enhancing additive is a compound having one of the following structures, in which the carbon atoms of —($C_3H_6$)— have been labeled 1, 2, and 3:

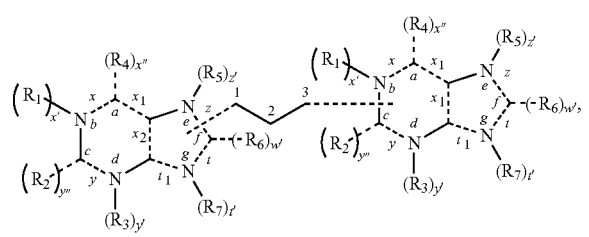

(Formula Ia$^1$)

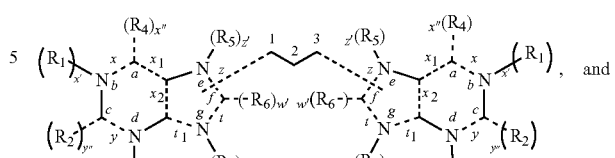

(Formula Ia$^2$), and

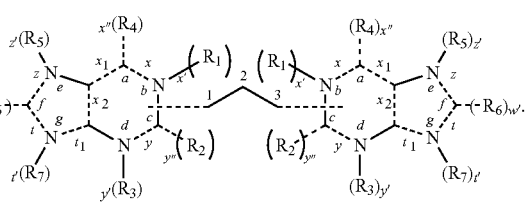

(Formula Ia$^3$)

In Formula Ia$^1$, the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia$^1$, the carbon atom labeled 3 may be singly or doubly bonded to atom a or c in the second structure Y, or singly bonded to atom b or d in the second structure Y. When the carbon atom labeled 3 is bonded to atom a or c in the second structure Y, x" or y", respectively, in the second structure Y is 0. When the carbon atom labeled 3 is bonded to atom b or d in the second structure Y, x' or y', respectively, in the second structure Y is 0.

In Formula Ia$^2$, the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia$^2$, the carbon atom labeled 3 may be singly or doubly bonded to atom f of the second structure Y, or singly bonded to atom e or g in the second structure Y. When the carbon atom labeled 3 is bonded to atom f in the second structure Y, w' in the second structure Y is 0. When the carbon atom labeled 3 is bonded to atom e or g in the second structure Y, z' or t', respectively, in the second structure Y is 0.

In Formula Ia$^3$, the carbon atom labeled 1 may be singly or doubly bonded to atom a or c in the first structure Y, or singly bonded to atom b or d in the first structure Y. When the carbon atom labeled 1 is bonded to atom a or c in the first structure Y, x" or y", respectively, in the first structure Y is 0. When the carbon atom labeled 1 is bonded to atom b or d in the first structure Y, x' or y', respectively, in the first structure Y is 0.

In Formula Ia$^3$, the carbon atom labeled 3 may be singly or doubly bonded to atom a or c in the second structure Y, or singly bonded to atom b or d in the second structure Y. When the carbon atom labeled 3 is bonded to atom a or c in the second structure Y, x" or y", respectively, in the second structure Y is 0. When the carbon atom labeled 3 is bonded to atom b or d in the second structure Y, x' or y', respectively, in the second structure Y is 0.

In one embodiment, the gas barrier enhancing additive is a compound having the chemical structure of Formula Ia$^2$, wherein the carbon atom labeled 1 is singly bonded to atom e in the first structure Y and z' is 0. In this embodiment, the compound has the chemical structure of Formula Ia$^{31}$:

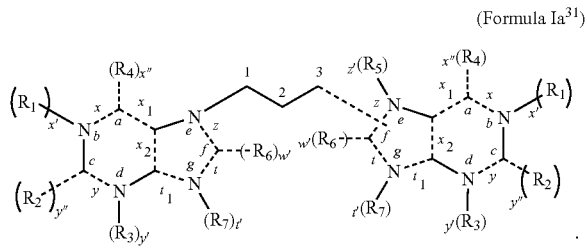

(Formula Ia$^{31}$)

In one embodiment, the gas barrier enhancing additive is a compound having the chemical structure of Formula Ia$^2$, wherein the carbon atom labeled 3 is singly bonded to atom e in the second structure Y and z' is 0. In this embodiment, the compound has the chemical structure of Formula Ia$^{32}$:

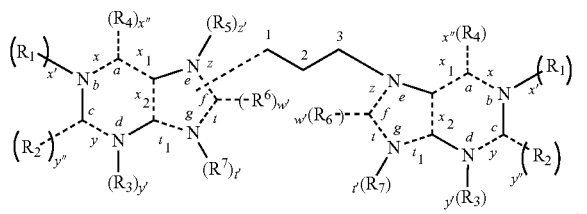

(Formula Ia$^{32}$)

In one embodiment, the gas barrier enhancing additive is a compound having the chemical structure of Formula Ia$^2$, wherein the carbon atom labeled 1 is singly bonded to atom e of the first structure Y, z' is 0 in the first structure Y, the carbon atom labeled 3 is singly bonded to atom e in the second structure Y, and z' is 0 in the second structure Y. In this embodiment, the compound has the chemical structure of Formula Ia$^{33}$:

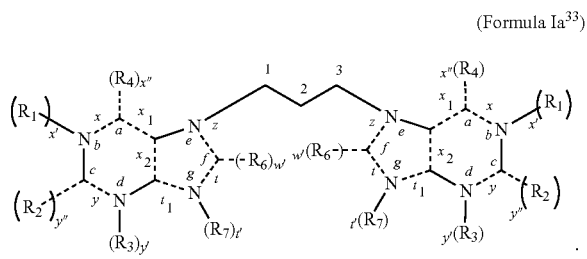

(Formula Ia$^{33}$)

In one embodiment, the gas barrier enhancing additive is a compound having the chemical structure of Formula Ia$^{33}$, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ia$^{34}$:

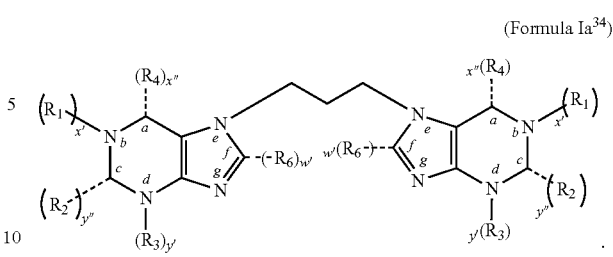

(Formula Ia$^{34}$)

In one embodiment, the gas barrier enhancing additive is a compound having the chemical structure of Formula Ia$^{34}$, wherein x' and y' in each structure Y are 1, and $R_1$ and $R_3$ are $C_1$ alkyls, i.e. methyl groups. In this embodiment, the compound has the chemical structure of Formula Ia$^{52}$:

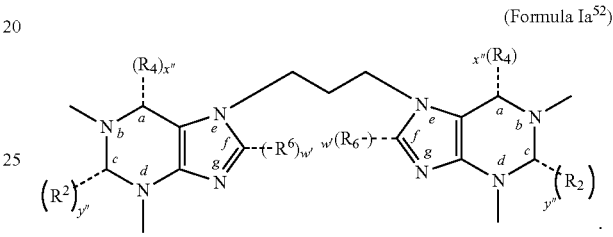

(Formula Ia$^{52}$)

In one embodiment, the gas barrier enhancing additive is a compound having the chemical structure of Formula Ia$^{34}$, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ia$^{35}$:

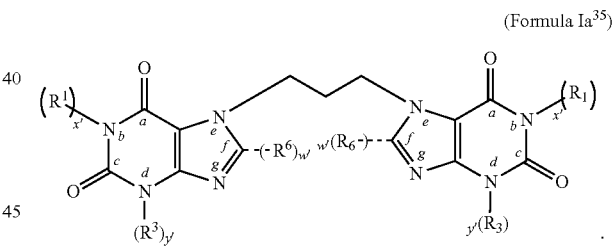

(Formula Ia$^{35}$)

In one embodiment, the gas barrier enhancing additive is a compound having the chemical structure of Formula Ia$^{35}$, wherein x' and y' in each structure Y are 1, and $R_1$ and $R_3$ are $C_1$ alkyls, i.e. methyl groups. In this embodiment, the compound has the chemical structure of Formula Ia$^{36}$:

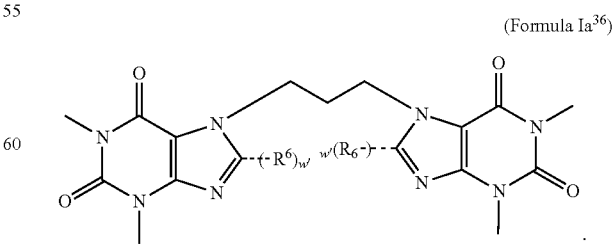

(Formula Ia$^{36}$)

In one embodiment, the gas barrier enhancing additive is a compound having the chemical structure of Formula Ia$^{36}$, wherein w' is 1 in each structure Y, and $R_6$ is hydrogen in each structure Y. In this embodiment, the compound has the chemical structure of XCP-1:

(XCP-1)

In one embodiment, the gas barrier enhancing additive is a compound having the chemical structure of Formula Ia$^3$, wherein the carbon atom labeled 1 is singly bonded to atom b in the first structure Y and x' is 0. In this embodiment, the gas barrier enhancing additive comprises a compound having the chemical structure of Formula Ia$^4$:

(Formula Ia$^4$)

In one embodiment, the gas barrier enhancing additive is a compound having the chemical structure of Formula Ia$^3$, wherein the carbon atom labeled 3 is singly bonded to atom b in the second structure Y and x' is 0. In this embodiment, the compound has the chemical structure of Formula Ia$^5$:

(Formula Ia$^5$)

In one embodiment, the gas barrier enhancing additive is a compound having the chemical structure of Formula Ia$^3$, wherein the carbon atom labeled 1 is singly bonded to atom b in the first structure Y and x' is 0 in the first structure Y, and wherein the carbon atom labeled 3 is singly bonded to atom b in the second structure Y and x' is 0 in the second structure Y. In this embodiment, the compound has the chemical structure of Formula Ia$^6$:

(Formula Ia$^6$)

In one embodiment, the gas barrier enhancing additive is a compound having the chemical structure of Formula Ia$^6$, wherein y, x, $x_1$, $t_1$ and z are single bonds in each structure Y, $x_2$ and t are double bonds in each structure Y, and t' is 0 in each structure Y. In this embodiment, the compound has the chemical structure of Formula Ia$^7$:

(Formula Ia$^7$)

In one embodiment, the gas barrier enhancing additive is a compound having the chemical structure of Formula Ia$^7$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^{53}$:

(Formula Ia$^{53}$)

In one embodiment, the gas barrier enhancing additive is a compound having the chemical structure of Formula Ia$^7$, wherein y'' and x''' are 1 in each structure Y, and $R_2$ and $R_4$, in each structure Y, are oxygen atoms doubly bonded to atoms c and a, respectively, in each structure Y. In this embodiment, the compound has the chemical structure of Formula Ia$^8$:

(Formula Ia$^8$)

In one embodiment, the gas barrier enhancing additive is a compound having the chemical structure of Formula Ia$^8$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^9$:

(Formula Ia$^9$)

In one embodiment, the gas barrier enhancing additive is a compound having the chemical structure of Formula Ia⁹, wherein w' is 1 in each structure Y, and $R_6$ is a hydrogen in each structure Y. In this embodiment, the compound has the chemical structure of XCP-2:

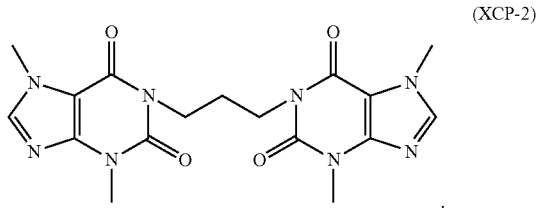 [SMILES: Cn1cnc2c1c(=O)n(CCCn1c(=O)c3c(ncn3C)n(C)c1=O)c(=O)n2C]

(XCP-2)

In one embodiment, the gas barrier enhancing additive is a compound having the chemical structure of Formula Ia', Formula Ia", or Formula Ia''', wherein $A^e$ is a $C_4$ hydrocarbyl. In one particular embodiment, the $C_4$ hydrocarbyl of $A^e$ in Formula Ia', Formula Ia", or Formula Ia''' is —($C_4H_8$)—, and the gas barrier enhancing additive is a compound having one of the following structures, in which the carbon atoms of —($C_4H_8$)— have been labeled 1, 2, 3, and 4:

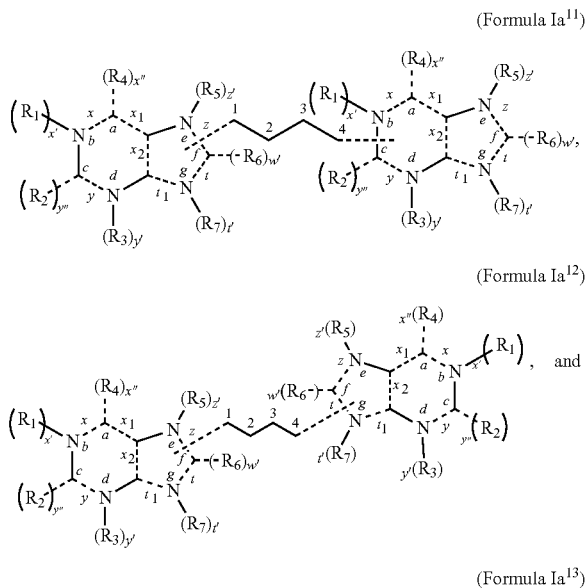

(Formula Ia¹¹)

(Formula Ia¹²), and (Formula Ia¹³)

In Formula Ia¹¹, the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia¹¹, the carbon atom labeled 4 may be singly or doubly bonded to atom a or c in the second structure Y, or singly bonded to atom b or d in the second structure Y. When the carbon atom labeled 4 is bonded to atom a or c in the second structure Y, x" or y", respectively, in the second structure Y is 0. When the carbon atom labeled 4 is bonded to atom b or d in the second structure Y, x' or y', respectively, in the second structure Y is 0.

In Formula Ia¹², the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia¹², the carbon atom labeled 4 may be singly or doubly bonded to atom f of the second structure Y, or singly bonded to atom e or g in the second structure Y. When the carbon atom labeled 4 is bonded to atom f in the second structure Y, w' in the second structure Y is 0. When the carbon atom labeled 4 is bonded to atom e or g in the second structure Y, z' or t', respectively, in the second structure Y is 0.

In Formula Ia¹³, the carbon atom labeled 1 may be singly or doubly bonded to atom a or c in the first structure Y, or singly bonded to atom b or d in the first structure Y. When the carbon atom labeled 1 is bonded to atom a or c in the first structure Y, x" or y", respectively, in the first structure Y is 0. When the carbon atom labeled 1 is bonded to atom b or d in the first structure Y, x' or y', respectively, in the first structure Y is 0.

In Formula Ia¹³, the carbon atom labeled 4 may be singly or doubly bonded to atom a or c in the second structure Y, or singly bonded to atom b or d in the second structure Y. When the carbon atom labeled 4 is bonded to atom a or c in the second structure Y, x" or y", respectively, in the second structure Y is 0. When the carbon atom labeled 4 is bonded to atom b or d in the second structure Y, x' or y', respectively, in the second structure Y is 0.

In one embodiment, the gas barrier enhancing additive is a compound having the chemical structure of Formula Ia¹², wherein the carbon atom labeled 1 is singly bonded to atom e in the first structure Y and z' is 0. In this embodiment, the compound has the chemical structure of Formula Ia³⁸:

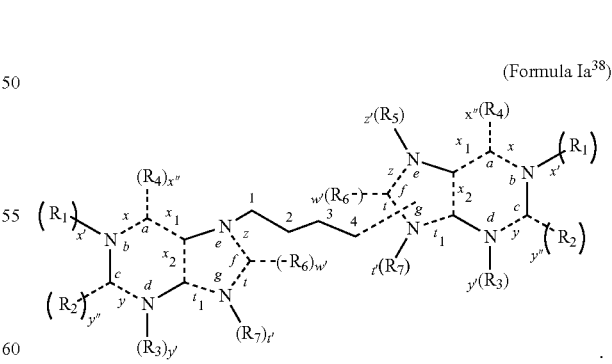

(Formula Ia³⁸)

In one embodiment, the gas barrier enhancing additive is a compound having the chemical structure of Formula Ia¹², wherein the carbon atom labeled 4 is singly bonded to atom e in the second structure Y and z' is 0. In this embodiment, the compound has the chemical structure of Formula Ia³⁹:

(Formula Ia³⁹)

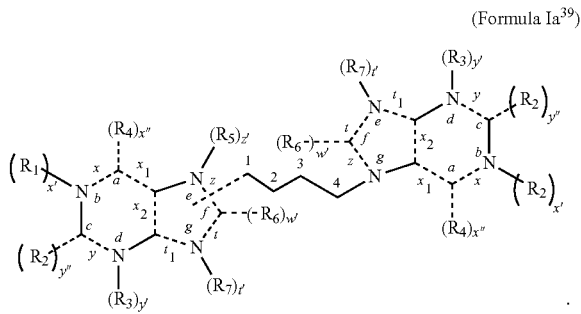

In one embodiment, the gas barrier enhancing additive is a compound having the chemical structure of Formula Ia¹², wherein the carbon atom labeled 1 is singly bonded to atom e of the first structure Y, z' is 0 in the first structure Y, the carbon atom labeled 4 is singly bonded to atom e in the second structure Y, and z' is 0 in the second structure Y. In this embodiment, the compound has the chemical structure of Formula Ia⁴⁰:

(Formula Ia⁴⁰)

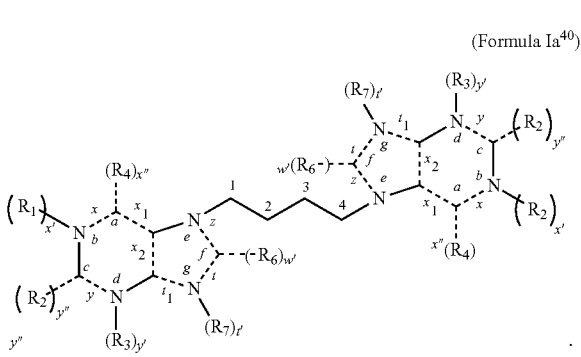

In one embodiment, the gas barrier enhancing additive is a compound having the chemical structure of Formula Ia⁴⁰, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ia⁴¹:

(Formula Ia⁴¹)

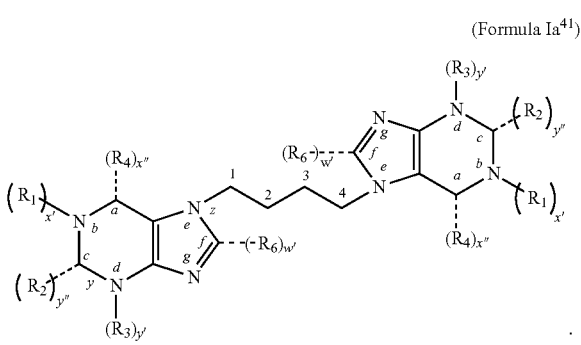

In one embodiment, the gas barrier enhancing additive is a compound having the chemical structure of Formula Ia⁴¹, wherein x' and y' in each structure Y are 1, and $R_1$ and $R_3$ are $C_1$ alkyls, i.e. methyl groups. In this embodiment, the compound has the chemical structure of Formula Ia⁵⁴:

(Formula Ia⁵⁴)

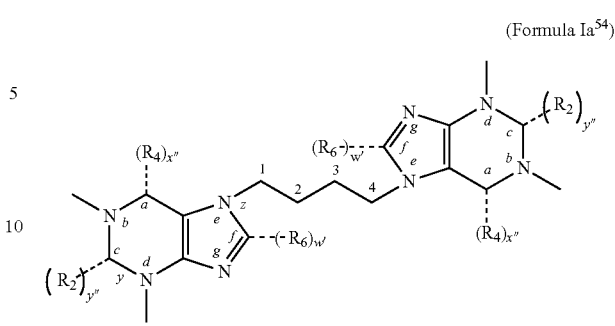

In one embodiment, the gas barrier enhancing additive is a compound having the chemical structure of Formula Ia⁴¹, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ia⁴²:

(Formula Ia⁴²)

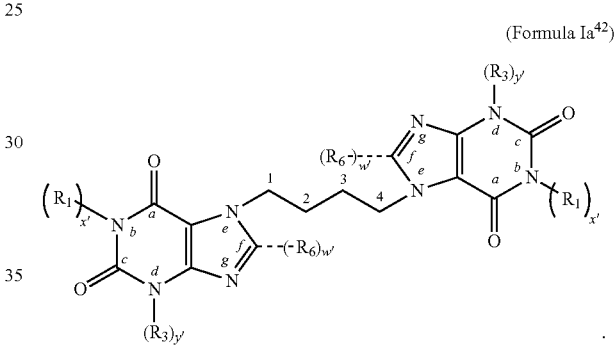

In one embodiment, the gas barrier enhancing additive is a compound having the chemical structure of Formula Ia⁴², wherein x' and y' in each structure Y are 1, and $R_1$ and $R_3$ are $C_1$ alkyls, i.e. methyl groups. In this embodiment, the compound has the chemical structure of Formula Ia⁴³:

(Formula Ia⁴³)

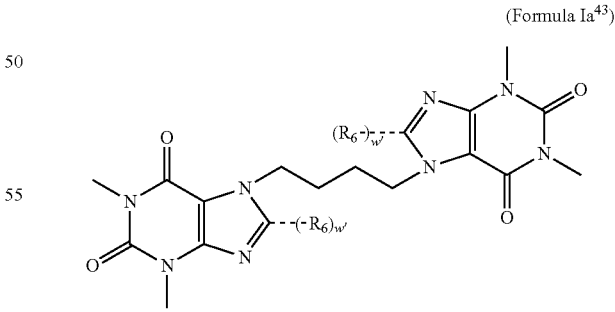

In one embodiment, the gas barrier enhancing additive is a compound having the chemical structure of Formula Ia⁴³, wherein w' is 1 in each structure Y, and $R_6$ is hydrogen in each structure Y. In this embodiment, the compound has the chemical structure of XCP-3:

(XCP-3)

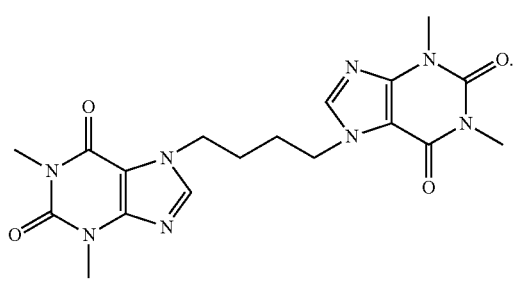

In one embodiment, the gas barrier enhancing additive is a compound having the chemical structure of Formula Ia$^{13}$, wherein the carbon atom labeled 1 is singly bonded to atom b in the first structure Y and x' is 0. In this embodiment, the gas barrier enhancing additive is a compound having the chemical structure of Formula Ia$^{14}$:

(Formula Ia$^{14}$)

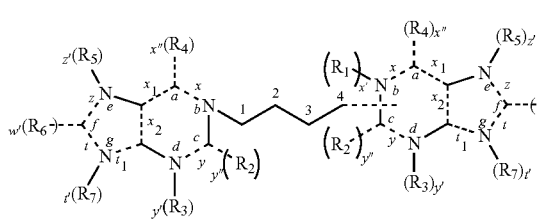

In one embodiment, the gas barrier enhancing additive is a compound having the chemical structure of Formula Ia$^{13}$, wherein the carbon atom labeled 4 is singly bonded to atom b in the second structure Y and x' is 0. In this embodiment, the compound has the chemical structure of Formula Ia$^{15}$:

(Formula Ia$^{15}$)

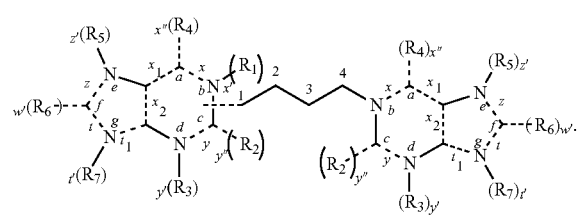

In one embodiment, the gas barrier enhancing additive is a compound having the chemical structure of Formula Ia$^{13}$, wherein the carbon atom labeled 1 is singly bonded to atom b in the first structure Y and x' is 0 in the first structure Y, and wherein the carbon atom labeled 4 is singly bonded to atom b in the second structure Y and x' is 0 in the second structure Y. In this embodiment, the compound has the chemical structure of Formula Ia$^{16}$:

(Formula Ia$^{16}$)

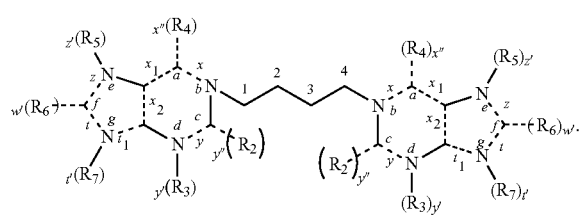

In one embodiment, the gas barrier enhancing additive is a compound having the chemical structure of Formula Ia$^{16}$, wherein y, x, $x_1$, $t_1$ and z are single bonds in each structure Y, $x_2$ and t are double bonds in each structure Y, and t' is 0 in each structure Y. In this embodiment, the compound has the chemical structure of Formula Ia$^{17}$:

(Formula Ia$^{17}$)

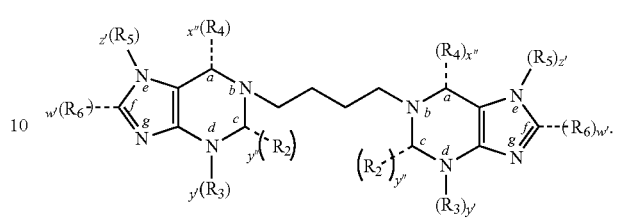

In one embodiment, the gas barrier enhancing additive is a compound having the chemical structure of Formula Ia$^{17}$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^{55}$:

(Formula Ia$^{55}$)

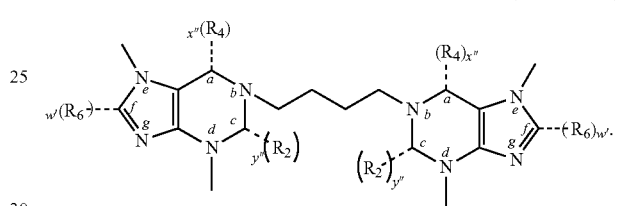

In one embodiment, the gas barrier enhancing additive is a compound having the chemical structure of Formula Ia$^{17}$, wherein y" and x" are 1 in each structure Y, and $R_2$ and $R_4$, in each structure Y, are oxygen atoms doubly bonded to atoms c and a, respectively, in each structure Y. In this embodiment, the compound has the chemical structure of Formula Ia$^{18}$:

(Formula Ia$^{18}$)

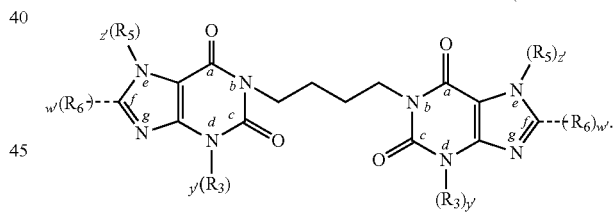

In one embodiment, the gas barrier enhancing additive is a compound having the chemical structure of Formula Ia$^{18}$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^{19}$:

(Formula Ia$^{19}$)

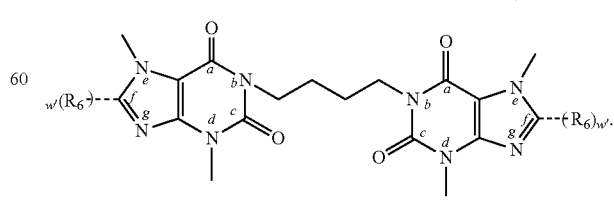

In one embodiment, the purine derivative is a compound having the chemical structure of Formula Ia$^{19}$, wherein w' is 1 in each structure Y, and $R_6$ is a hydrogen in each structure Y. In this embodiment, the compound has the chemical structure of XCP-5:

(XCP-5)

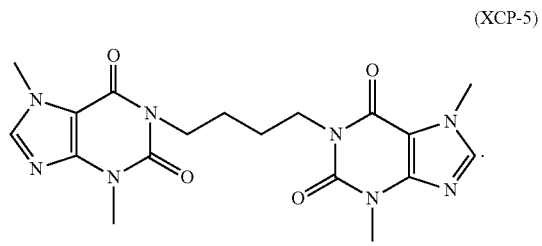 [SMILES: Cn1cnc2c1c(=O)n(CCCCn1c(=O)c3c(ncn3C)n(C)c1=O)c(=O)n2C]

In one embodiment, the gas barrier enhancing additive comprises a compound having the chemical structure of Formula Ia', Formula Ia'', or Formula Ia''', wherein $A^e$ is a $C_8$ hydrocarbyl. In one particular embodiment, the $C_8$ hydrocarbyl of $A^e$ in Formula Ia', Formula Ia'', or Formula Ia''' is —$(C_8H_{16})$—, and the gas barrier enhancing additive is a compound having one of the following structures, in which the carbon atoms of —$(C_8H_{16})$— have been labeled 1 and 6:

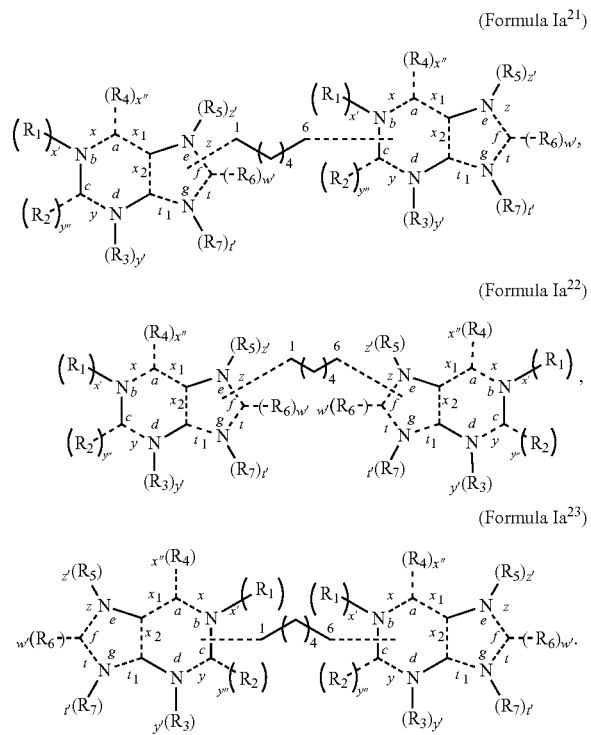

(Formula Ia$^{21}$)

(Formula Ia$^{22}$)

(Formula Ia$^{23}$)

In Formula Ia$^{21}$, the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia$^{21}$, the carbon atom labeled 6 may be singly or doubly bonded to atom a or c in the second structure Y, or singly bonded to atom b or d in the second structure Y. When the carbon atom labeled 6 is bonded to atom a or c in the second structure Y, x'' or y'', respectively, in the second structure Y is 0. When the carbon atom labeled 6 is bonded to atom b or d in the second structure Y, x' or y', respectively, in the second structure Y is 0.

In Formula Ia$^{22}$, the carbon atom labeled 1 may be singly or doubly bonded to atom f of the first structure Y, or singly bonded to atom e or g in the first structure Y. When the carbon atom labeled 1 is bonded to atom f in the first structure Y, w' in the first structure Y is 0. When the carbon atom labeled 1 is bonded to atom e or g in the first structure Y, z' or t', respectively, in the first structure Y is 0.

In Formula Ia$^{22}$, the carbon atom labeled 6 may be singly or doubly bonded to atom f of the second structure Y, or singly bonded to atom e or g in the second structure Y. When the carbon atom labeled 6 is bonded to atom f in the second structure Y, w' in the second structure Y is 0. When the carbon atom labeled 6 is bonded to atom e or g in the second structure Y, z' or t', respectively, in the second structure Y is 0.

In Formula Ia$^{23}$, the carbon atom labeled 1 may be singly or doubly bonded to atom a or c in the first structure Y, or singly bonded to atom b or d in the first structure Y. When the carbon atom labeled 1 is bonded to atom a or c in the first structure Y, x'' or y'', respectively, in the first structure Y is 0. When the carbon atom labeled 1 is bonded to atom b or d in the first structure Y, x' or y', respectively, in the first structure Y is 0.

In Formula Ia$^{23}$, the carbon atom labeled 6 may be singly or doubly bonded to atom a or c in the second structure Y, or singly bonded to atom b or d in the second structure Y. When the carbon atom labeled 6 is bonded to atom a or c in the second structure Y, x'' or y'', respectively, in the second structure Y is 0. When the carbon atom labeled 6 is bonded to atom b or d in the second structure Y, x' or y', respectively, in the second structure Y is 0.

In one embodiment, the gas barrier enhancing additive is a compound having the chemical structure of Formula Ia$^{22}$, wherein the carbon atom labeled 1 is singly bonded to atom e in the first structure Y and z' is 0. In this embodiment, the compound has the chemical structure of Formula Ia$^{45}$:

(Formula Ia$^{45}$)

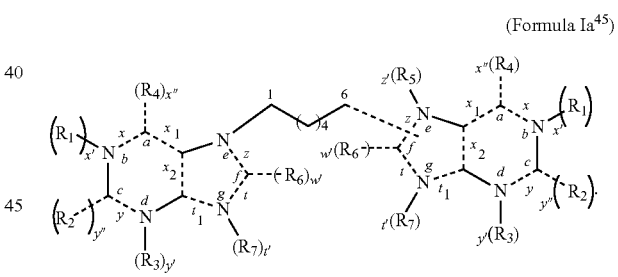

In one embodiment, the gas barrier enhancing additive is a compound having the chemical structure of Formula Ia$^{22}$, wherein the carbon atom labeled 6 is singly bonded to atom e in the second structure Y and z' is 0. In this embodiment, the compound has the chemical structure of Formula Ia$^{46}$:

(Formula Ia$^{46}$)

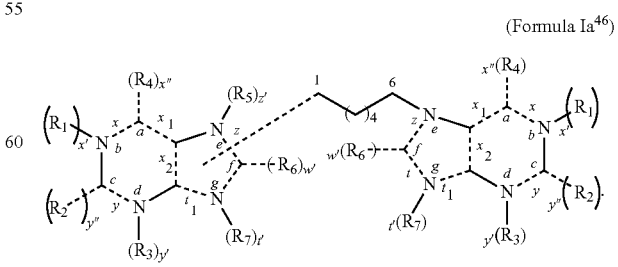

In one embodiment, the gas barrier enhancing additive is a compound having the chemical structure of Formula Ia$^{22}$, wherein the carbon atom labeled 1 is singly bonded to atom e of the first structure Y, z' is 0 in the first structure Y, the carbon atom labeled 6 is singly bonded to atom e in the second structure Y, and z' is 0 in the second structure Y. In this embodiment, the compound has the chemical structure of Formula Ia$^{47}$:

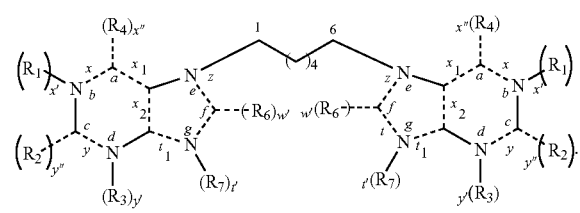

(Formula Ia$^{47}$)

In one embodiment, the gas barrier enhancing additive is a compound having the chemical structure of Formula Ia$^{47}$, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ia$^{48}$:

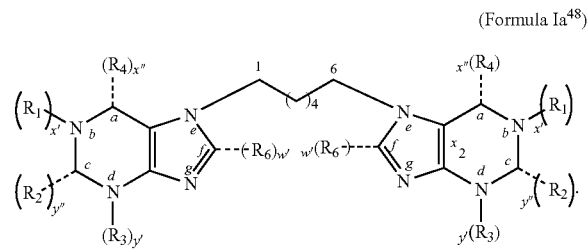

(Formula Ia$^{48}$)

In one embodiment, the gas barrier enhancing additive is a compound having the chemical structure of Formula Ia$^{48}$, wherein x' and y' in each structure Y are 1, and $R_1$ and $R_3$ are $C_1$ alkyls, i.e. methyl groups. In this embodiment, the compound has the chemical structure of Formula Ia$^{56}$:

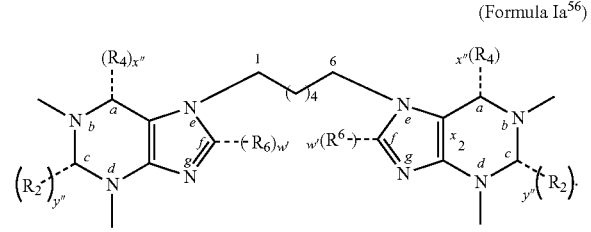

(Formula Ia$^{56}$)

In one embodiment, the gas barrier enhancing additive is a compound having the chemical structure of Formula Ia$^{48}$, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ia$^{49}$:

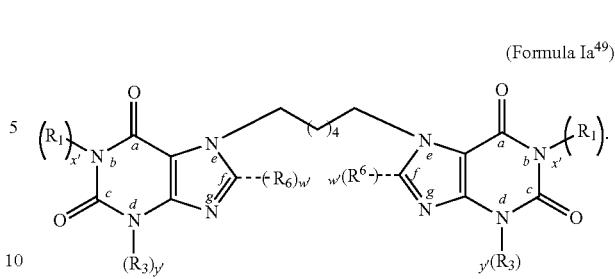

(Formula Ia$^{49}$)

In one embodiment, the gas barrier enhancing additive is a compound having the chemical structure of Formula Ia$^{49}$, wherein x' and y' in each structure Y are 1, and $R_1$ and $R_3$ are $C_1$ alkyls, i.e. methyl groups. In this embodiment, the compound has the chemical structure of Formula Ia$^{50}$:

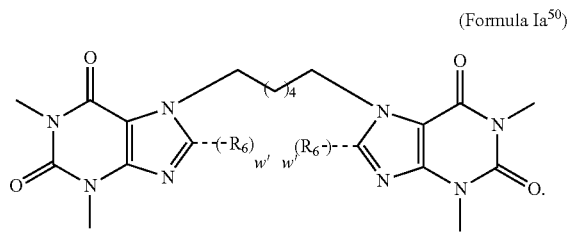

(Formula Ia$^{50}$)

In one embodiment, the gas barrier enhancing additive is a compound having the chemical structure of Formula Ia$^{50}$, wherein w' is 1 in each structure Y, and $R_6$ is hydrogen in each structure Y. In this embodiment, the compound has the chemical structure of Formula Ia$^{51}$:

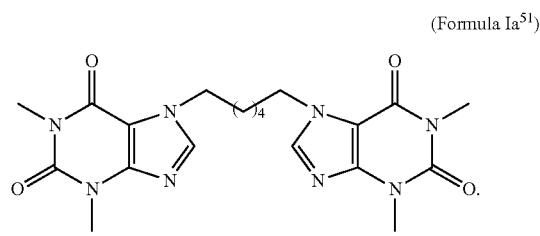

(Formula Ia$^{51}$)

In one embodiment, the gas barrier enhancing additive is a compound having the chemical structure of Formula Ia$^{23}$, wherein the carbon atom labeled 1 is singly bonded to atom b in the first structure Y and x' is 0. In this embodiment, the gas barrier enhancing additive is a compound having the chemical structure of Formula Ia$^{24}$:

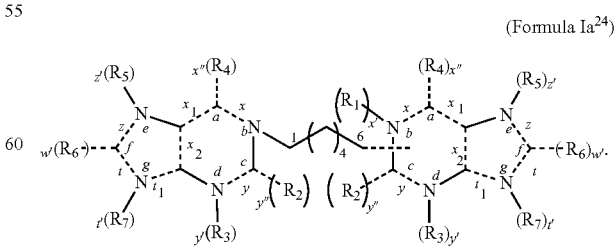

(Formula Ia$^{24}$)

In one embodiment, the purine derivative is a compound having the chemical structure of Formula Ia$^{23}$, wherein the carbon atom labeled 6 is singly bonded to atom b in the second structure Y and x' is 0. In this embodiment, the compound has the chemical structure of Formula Ia$^{25}$:

(Formula Ia$^{25}$)

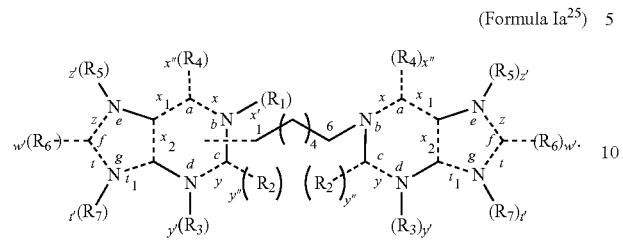

In one embodiment, the gas barrier enhancing additive is a compound having the chemical structure of Formula Ia$^{23}$, wherein the carbon atom labeled 1 is singly bonded to atom b in the first structure Y and x' is 0 in the first structure Y, and wherein the carbon atom labeled 6 is singly bonded to atom b in the second structure Y and x' is 0 in the second structure Y. In this embodiment, the compound has the chemical structure of Formula Ia$^{26}$:

(Formula Ia$^{26}$)

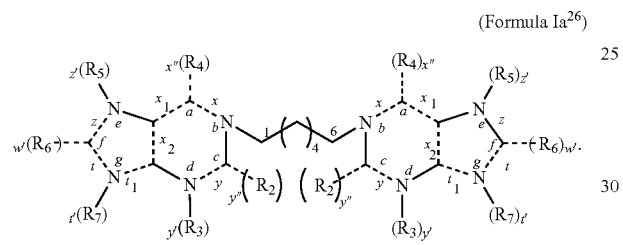

In one embodiment, the gas barrier enhancing additive is a compound having the chemical structure of Formula Ia$^{26}$, wherein y, x, $x_1$, $t_1$ and z are single bonds in each structure Y, $x_2$ and t are double bonds in each structure Y, and t' is 0 in each structure Y. In this embodiment, the compound has the chemical structure of Formula Ia$^{27}$:

(Formula Ia$^{27}$)

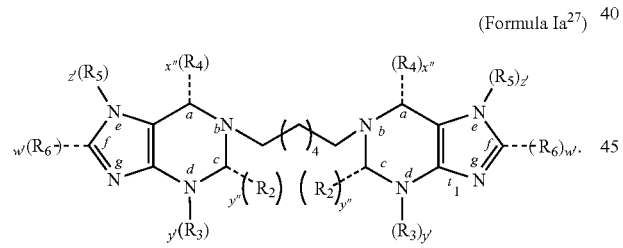

In one embodiment, the gas barrier enhancing additive is a compound having the chemical structure of Formula Ia$^{27}$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^{57}$:

(Formula Ia$^{57}$)

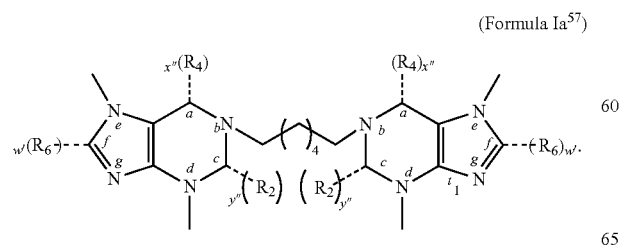

In one embodiment, the gas barrier enhancing additive is a compound having the chemical structure of Formula Ia$^{27}$, wherein y" and x" are 1 in each structure Y, and $R_2$ and $R_4$, in each structure Y, are oxygen atoms doubly bonded to atoms c and a, respectively, in each structure Y. In this embodiment, the compound has the chemical structure of Formula Ia$^{28}$:

(Formula Ia$^{28}$)

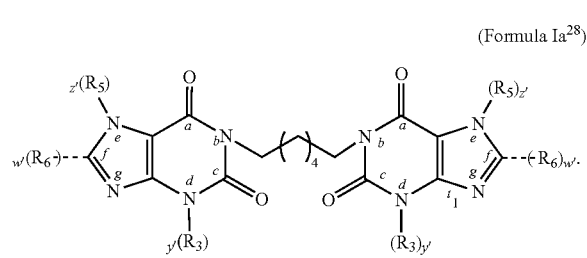

In one embodiment, the gas barrier enhancing additive is a compound having the chemical structure of Formula Ia$^{28}$, wherein z' and y' are 1 in each structure Y, and $R_3$ and $R_5$ are $C_1$ alkyls, i.e. methyl groups, in each structure Y. In this embodiment, the compound has the chemical structure of Formula Ia$^{29}$:

(Formula Ia$^{29}$)

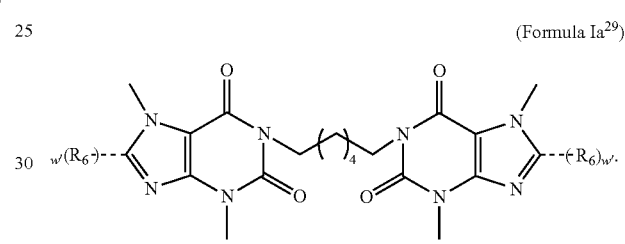

In one embodiment, the gas barrier enhancing additive is a compound having the chemical structure of Formula Ia$^{29}$, wherein w' is 1 in each structure Y, and $R_6$ is a hydrogen in each structure Y. In this embodiment, the compound has the chemical structure of Formula Ia$^{30}$:

(Formula Ia$^{30}$)

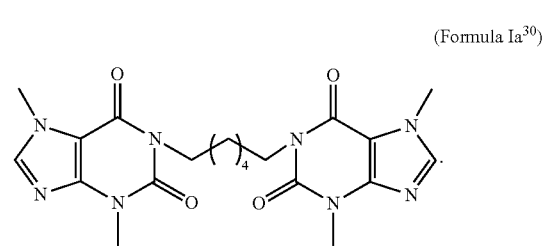

In a particular embodiment, the gas barrier enhancing additive is selected from the following compounds:

XCP-4

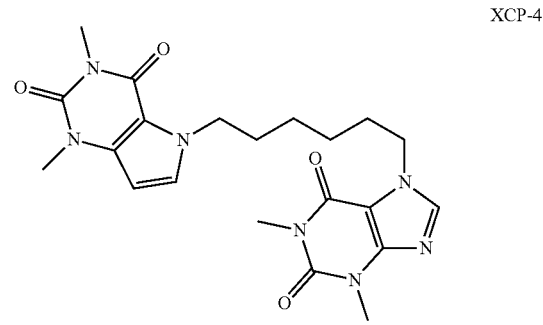

XCP-6

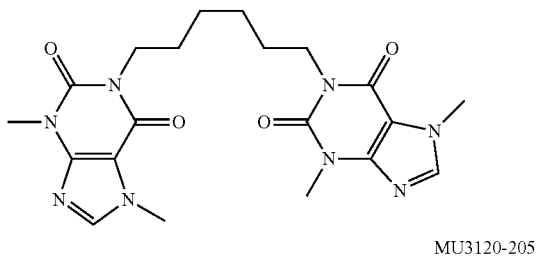

MU3120-205

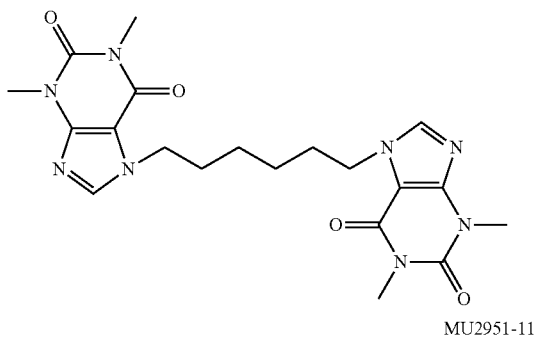

MU2951-11

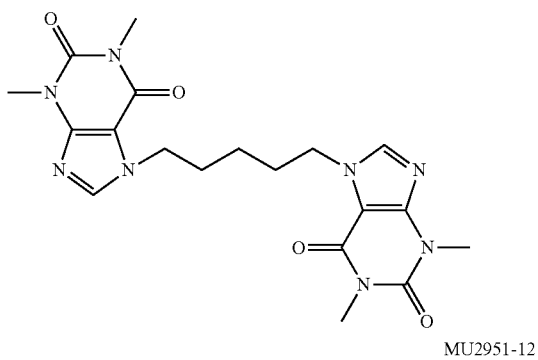

MU2951-12

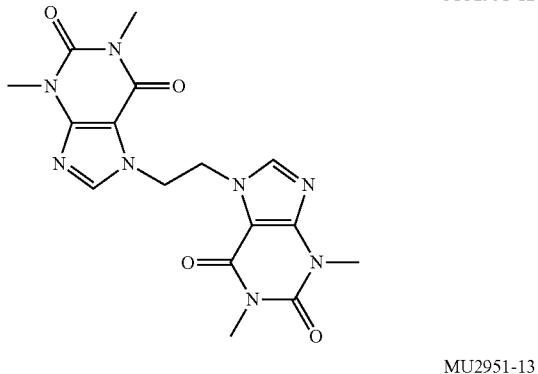

MU2951-13

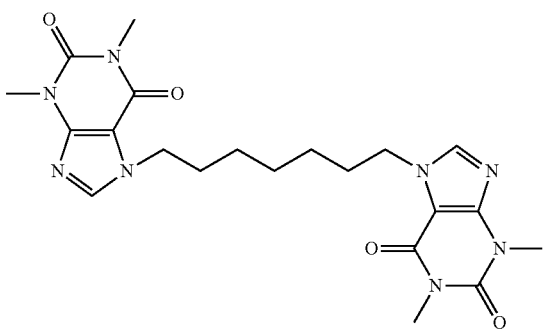

MU2951-14

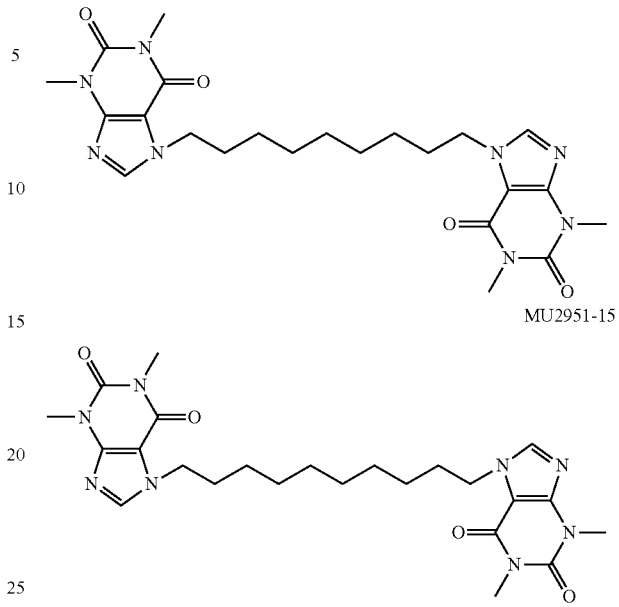

MU2951-15

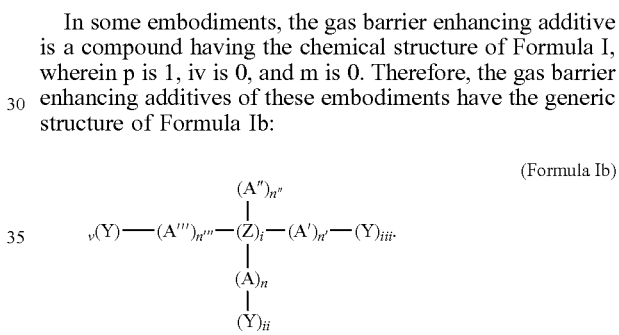

In some embodiments, the gas barrier enhancing additive is a compound having the chemical structure of Formula I, wherein p is 1, iv is 0, and m is 0. Therefore, the gas barrier enhancing additives of these embodiments have the generic structure of Formula Ib:

$$_v(Y)-(A''')_{n'''}-(Z)_i\genfrac{}{}{0pt}{}{\overset{(A'')_{n''}}{|}}{\underset{\underset{(Y)_{ii}}{|}}{\underset{(A)_n}{|}}}-(A')_{n'}-(Y)_{iii}.$$

(Formula Ib)

In certain embodiments, the gas barrier enhancing additive is a compound having the chemical structure of Formula Ib, wherein v and n''' are 1, and, in these certain embodiments, (A''') may be singly or doubly bonded to atoms a, c, or f of $(Y)_v$, or singly bonded to atoms b, d, e, or g of $(Y)_v$. When, in these embodiments, (A''') is bonded to one of atoms a, b, c, d, e, f, or g, then x'', x', y'', y', z', w', or t', respectively, in $(Y)_v$ is 0.

In other certain embodiments, the gas barrier enhancing additive is a compound having the chemical structure of Formula Ib, wherein iii and n' are 1, and, in these other certain embodiments, (A') may be singly or doubly bonded to atoms a, c, or f of $(Y)_{iii}$, or singly bonded to atoms b, d, e, or g of $(Y)_{iii}$. When, in these embodiments, (A') is bonded to one of atoms a, b, c, d, e, f, or g, then x'', x', y'', y', z', w', or t', respectively, in $(Y)_{iii}$ is 0.

In still other certain embodiments, the purine derivative is a compound having the chemical structure of Formula Ib, wherein ii and n are 1, and, in these other certain embodiments, (A) may be singly or doubly bonded to atoms a, c, or f of $(Y)_{ii}$, or singly bonded to atoms b, d, e, or g of $(Y)_{ii}$. When, in these embodiments, (A) is bonded to one of atoms a, b, c, d, e, f, or g, then x'', x', y'', y', z', w', or t', respectively, in $(Y)_{ii}$ is 0.

Therefore, in some embodiments, the gas barrier enhancing additive is a compound having the chemical structure of Formula Ib, wherein, v, n''', iii, n', ii, and n are 1. In these embodiments, the compound may have one of the following generic structures:

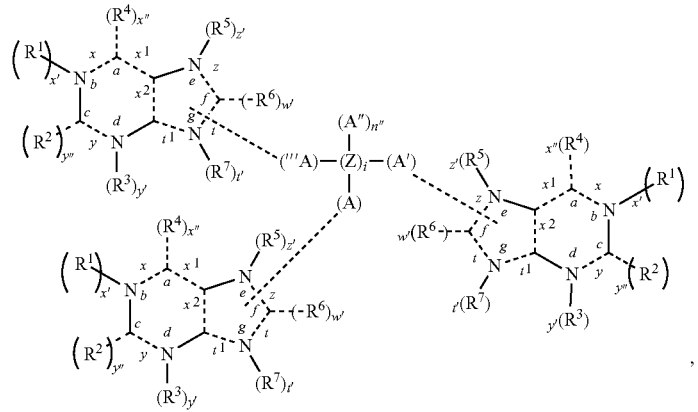
(Formula Ib')
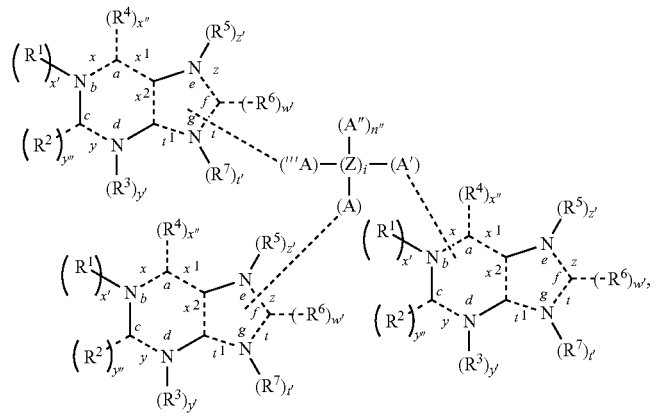
(Formula Ib'')
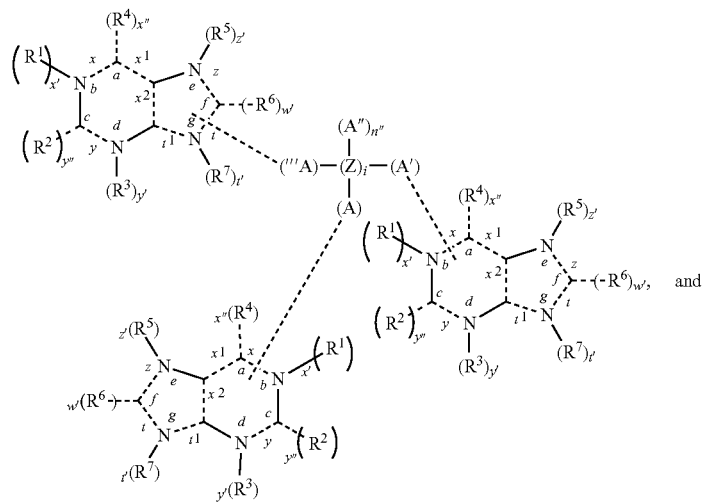
(Formula Ib'''), and (Formula Ib$^{iv}$)

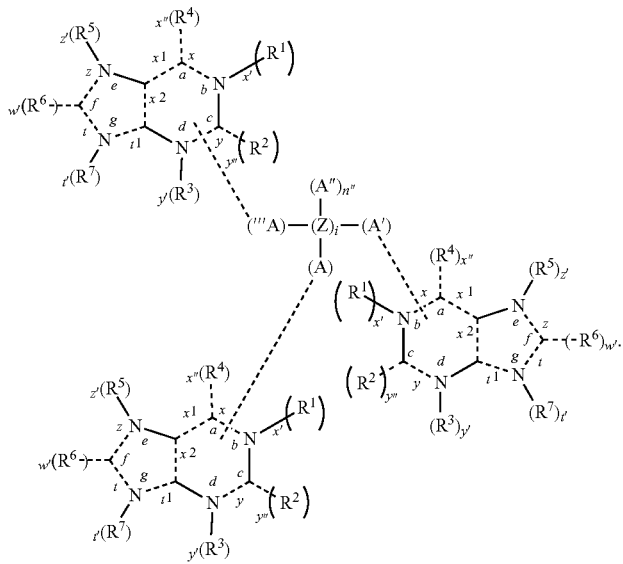

In some embodiments, the gas barrier enhancing additive is a compound having the chemical structure of Formula Ib', Formula Ib'', Formula Ib''', or Formula Ib$^{iv}$ wherein n'' is 1, i is 1, A'' is hydrogen, and Z is a carbon atom. In these embodiments, the compound has a structure according to Formula Ib$^1$, Formula Ib$^2$, Formula Ib$^3$, or Formula Ib$^{21}$, respectively:

(Formula Ib$^1$)

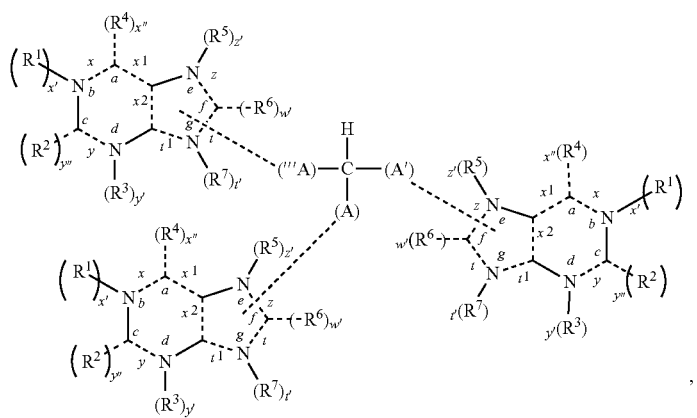

, (Formula Ib$^2$)

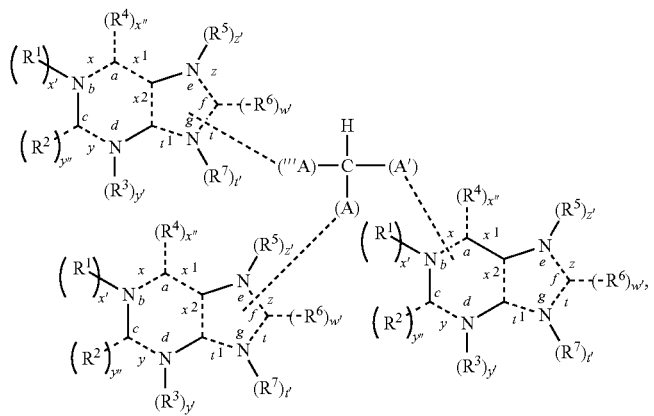

(Formula Ib³)
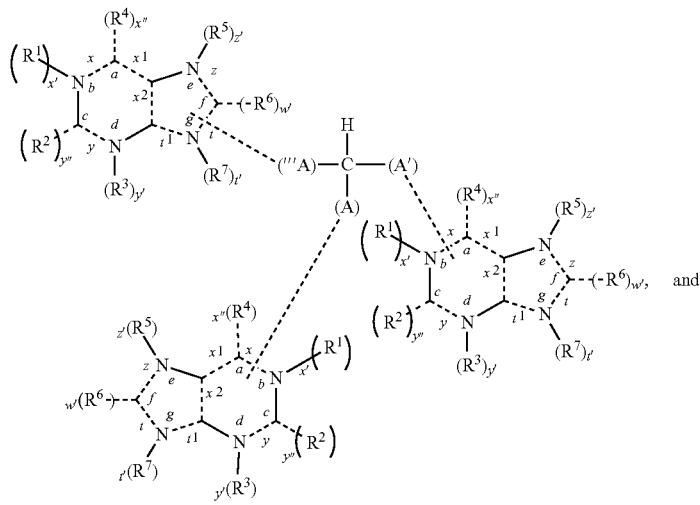
and
(Formula Ib²¹)
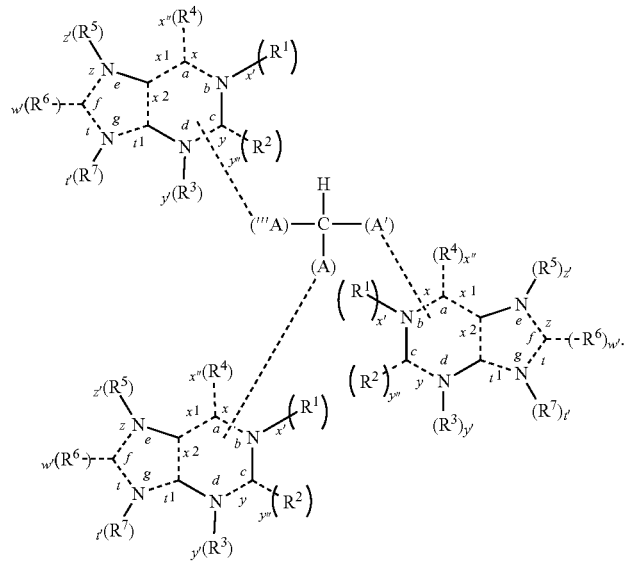
In some embodiments, the gas barrier enhancing additive is a compound having the chemical structure of Formula Ib', Formula Ib'', Formula Ib''', or Formula Ib' wherein n'' is 0, i is 1, and Z is a nitrogen atom. In these embodiments, the compound has a structure according to Formula Ib⁴, Formula Ib⁵, or Formula Ib⁶, respectively:
(Formula Ib⁴)
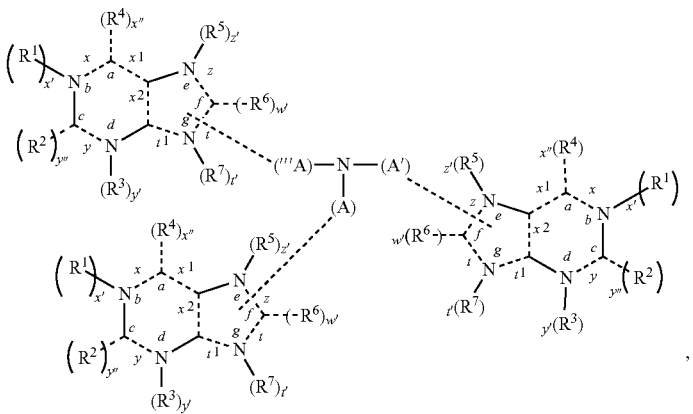

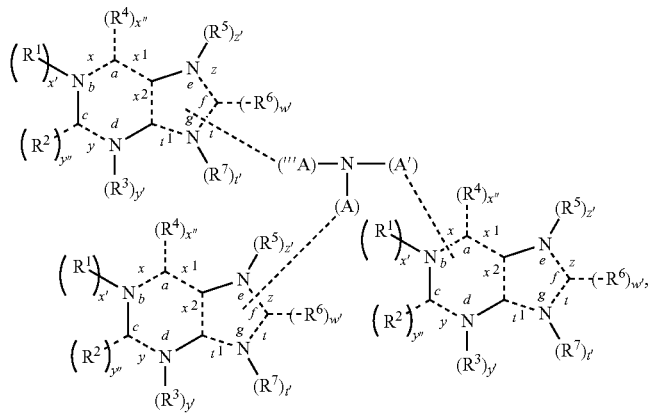
(Formula Ib⁵)
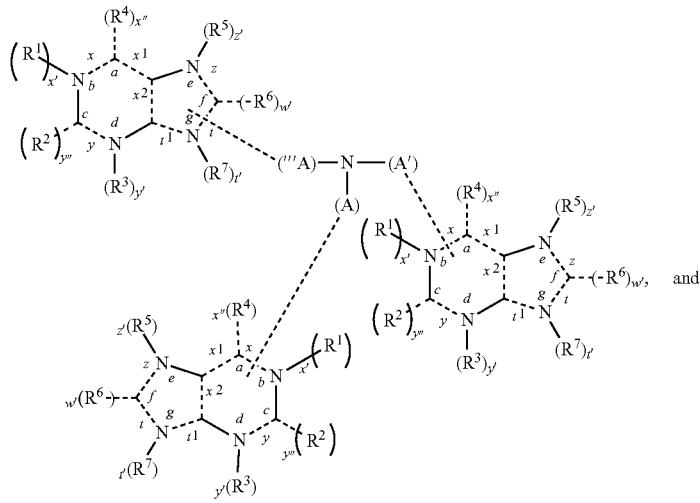
(Formula Ib⁶)
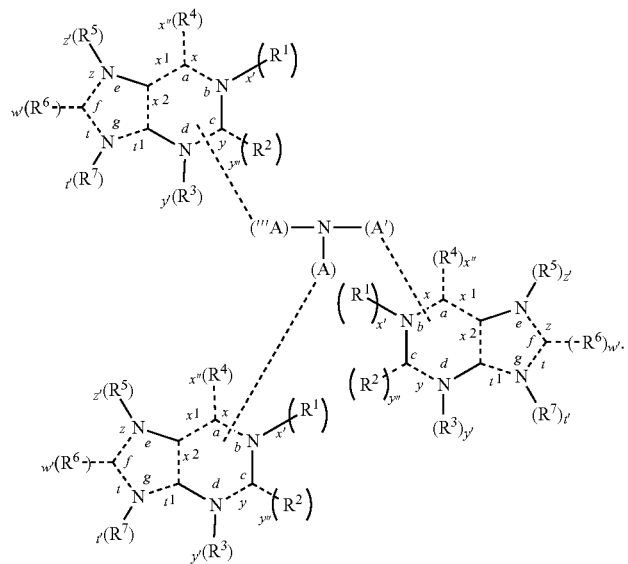
(Formula Ib²²)
In one embodiment, the gas barrier enhancing additive is a compound having the chemical structure of Formula Ib¹, wherein A, A', and A''' are, independently of each other, a $C^1$-$C^{20}$ hydrocarbyl having the formula —$(C_{1-20}H_{2-40})$—. In this embodiment, the compound has the chemical structure of Formula Ib⁷:

(Formula Ib⁷)

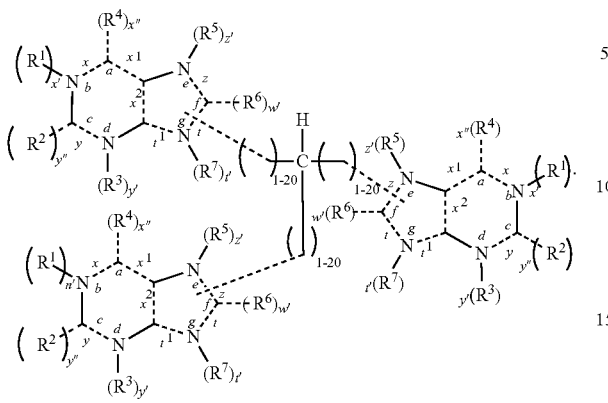

In one embodiment, the gas barrier enhancing additive is a compound having the chemical structure of Formula Ib⁷, wherein z' is 0 in each structure Y, and $C_1$-$C_{20}$ hydrocarbyl is singly bonded to atom e in each respective structure Y. In this embodiment, the compound has the chemical structure of Formula Ib⁸:

(Formula Ib⁸)

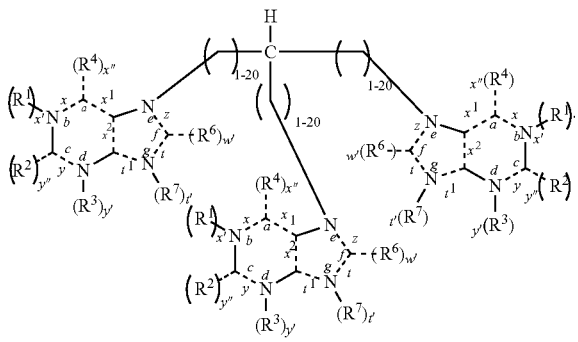

In one embodiment, the gas barrier enhancing additive is a compound having the chemical structure of Formula Ib⁸, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ib⁹:

(Formula Ib⁹)

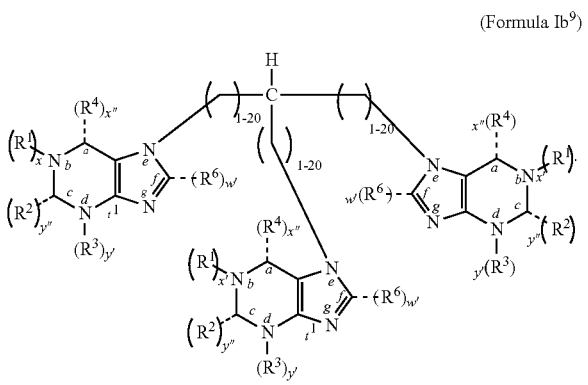

In one embodiment, the gas barrier enhancing additive is a compound having the chemical structure of Formula Ib⁹, wherein x' and y' in each structure Y are 1, and $R_1$ and $R_3$ are $C_1$ alkyls, i.e. methyl groups. In this embodiment, the compound has the chemical structure of Formula Ib¹⁰:

(Formula Ib¹⁰)

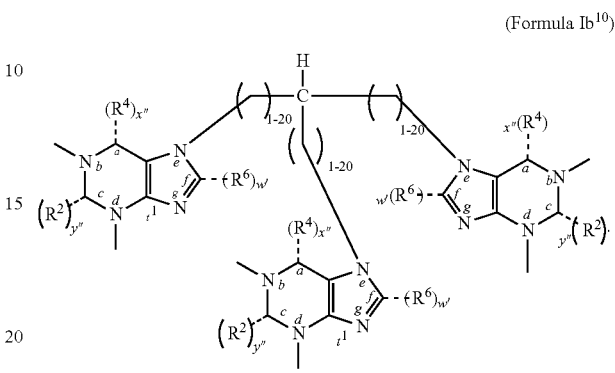

In one embodiment, the gas barrier enhancing additive is a compound having the chemical structure of Formula Ib¹⁰, wherein x'' and y'' in each structure Y are 1, and $R_2$ and $R_4$ are, in each structure Y, oxygen atoms that are doubly bonded to atoms c and a, respectively. In this embodiment, the compound has the chemical structure of Formula Ib¹¹:

(Formula Ib¹¹)

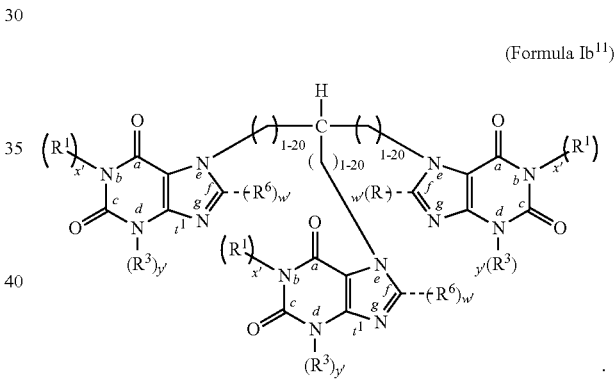

In one embodiment, the gas barrier enhancing additive is a compound having the chemical structure of Formula Ib¹¹, wherein x' and y' in each structure Y are 1, and $R_1$ and $R_3$ are $C_1$ alkyls, i.e. methyl groups. In this embodiment, the compound has the chemical structure of Formula Ib¹²:

(Formula Ib¹²)

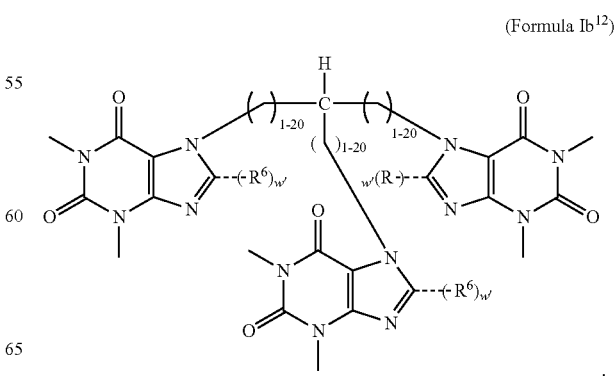

In one embodiment, the gas barrier enhancing additive is a compound having the chemical structure of Formula Ib$^{12}$, wherein w' is 1 in each structure Y, and R$_6$ is hydrogen in each structure Y. In this embodiment, the compound has the chemical structure of Formula Ib$^{13}$:

(Formula Ib$^{13}$)

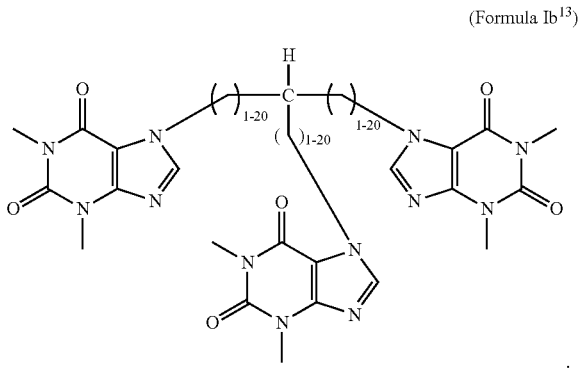

In one embodiment, the gas barrier enhancing additive is a compound having the chemical structure of Formula Ib$^4$, wherein A, A', and A''' are, independently of each other, a C$^1$-C$^{20}$ hydrocarbyl having the formula —(C$_{1-20}$H$_{2-40}$)—. In this embodiment, the compound has the chemical structure of Formula Ib$^{14}$:

(Formula Ib$^{14}$)

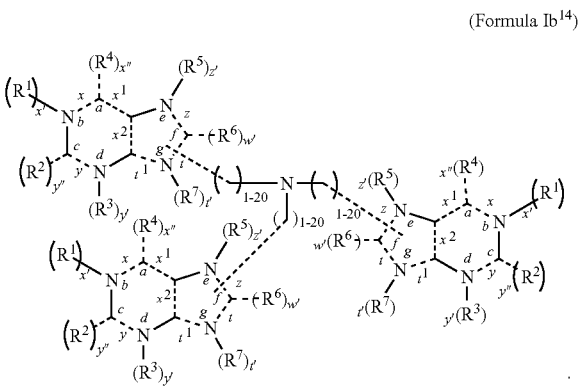

In one embodiment, the gas barrier enhancing additive is a compound having the chemical structure of Formula Ib$^{14}$, wherein z' is 0 in each structure Y, and C$_1$-C$_{20}$ hydrocarbyl is singly bonded to atom e in each respective structure Y. In this embodiment, the compound has the chemical structure of Formula Ib$^{15}$:

(Formula Ib$^{15}$)

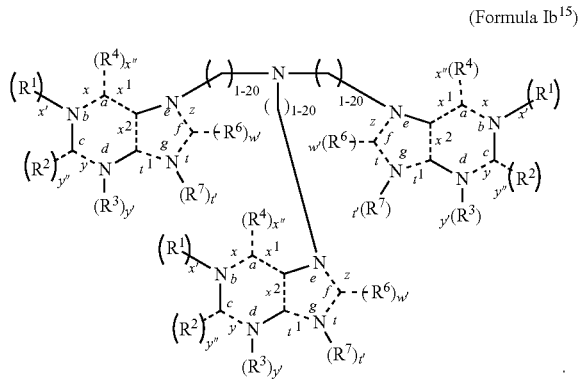

In one embodiment, the gas barrier enhancing additive is a compound having the chemical structure of Formula Ib$^{15}$, wherein z, t$_1$, y, x, and x$_1$ are single bonds in each structure Y, x$_2$ and t are double bonds in each structure Y, and t' is 0 in each structure Y. In this embodiment, the compound has the chemical structure of Formula Ib$^{16}$:

(Formula Ib$^{16}$)

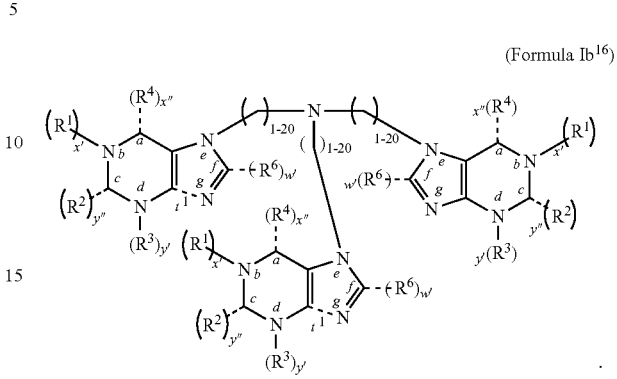

In one embodiment, the gas barrier enhancing additive is a compound having the chemical structure of Formula Ib$^{16}$, wherein x' and y' in each structure Y are 1, and R$_1$ and R$_3$ are C$_1$ alkyls, i.e. methyl groups. In this embodiment, the compound has the chemical structure of Formula Ib$^{17}$:

(Formula Ib$^{17}$)

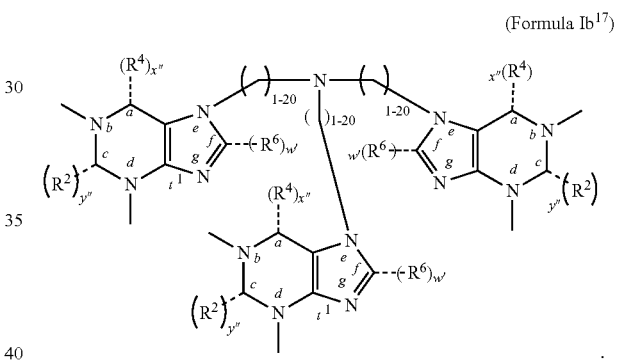

In one embodiment, the gas barrier enhancing additive is a compound having the chemical structure of Formula Ib$^{17}$, wherein x'' and y'' in each structure Y are 1, and R$_2$ and R$_4$ are, in each structure Y, oxygen atoms that are doubly bonded to atoms c and a, respectively. In this embodiment, the compound has the chemical structure of Formula Ib$^{18}$:

(Formula Ib$^{18}$)

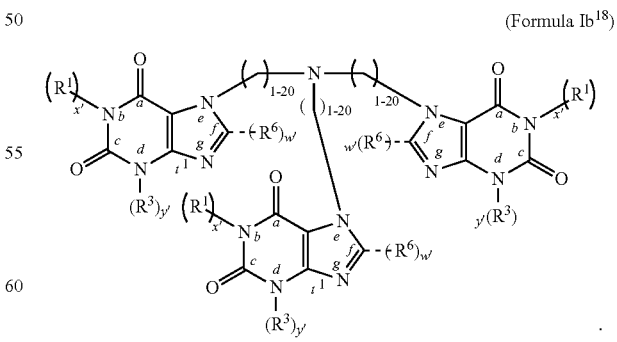

In one embodiment, the gas barrier enhancing additive is a compound having the chemical structure of Formula Ib$^{18}$, wherein x' and y' in each structure Y are 1, and R$_1$ and R$_3$ are C$_1$ alkyls, i.e. methyl groups. In this embodiment, the compound has the chemical structure of Formula Ib$^{19}$:

(Formula Ib19)

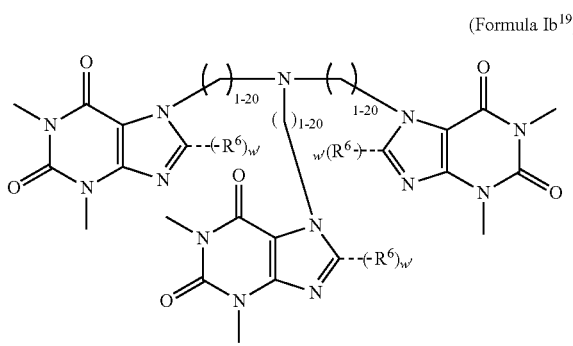

In one embodiment, the gas barrier enhancing additive is a compound having the chemical structure of Formula Ib$^{19}$, wherein w' is 1 in each structure Y, and R$_6$ is hydrogen in each structure Y. In this embodiment, the compound has the chemical structure of Formula Ib$^{20}$:

(Formula Ib20)

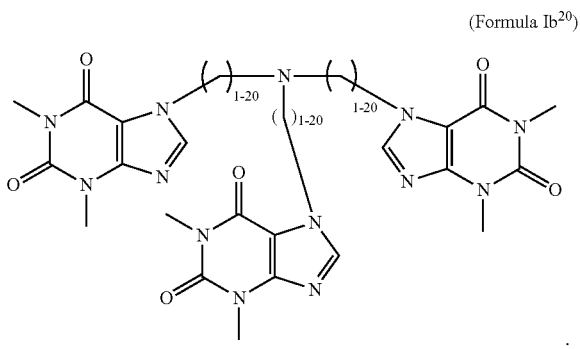

In one embodiment, the gas barrier enhancing additive is a compound having the chemical structure of Formula Ib$^{21}$, wherein A, A', and A'" are, independently of each other, a C$^1$-C$^{20}$ hydrocarbyl having the formula —(C$_{1-20}$H$_{2-40}$)—. In this embodiment, the compound has the chemical structure of Formula Ib$^{25}$:

(Formula Ib25)

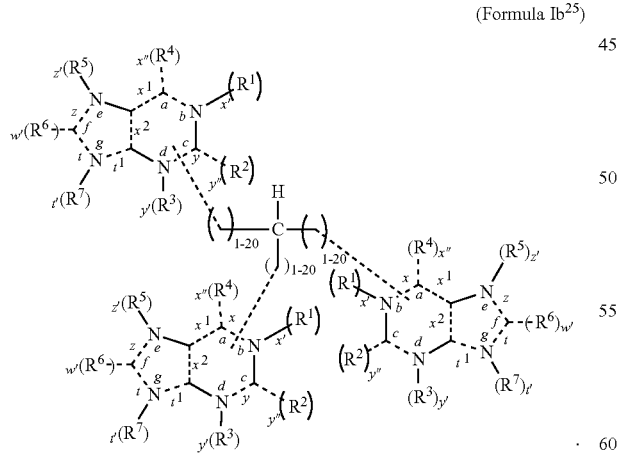

In one embodiment, the gas barrier enhancing additive is a compound having the chemical structure of Formula Ib$^{25}$, wherein x' is 0 in each structure Y, and C$_1$-C$_{20}$ hydrocarbyl is singly bonded to atom b in each respective structure Y. In this embodiment, the compound has the chemical structure of Formula Ib$^{26}$:

(Formula Ib26)

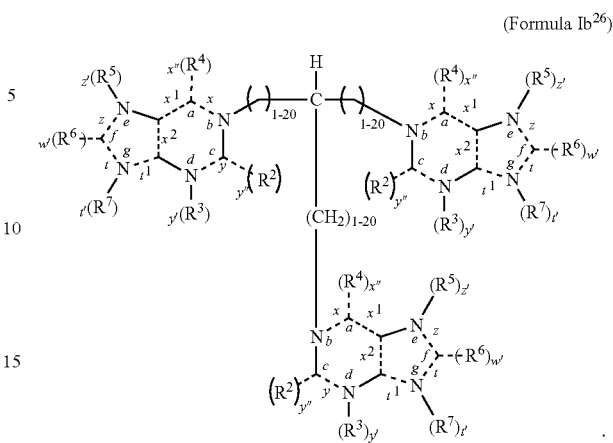

In one embodiment, the gas barrier enhancing additive is a compound having the chemical structure of Formula Ib$^{26}$, wherein z, t$_1$, y, x, and x$_1$ are single bonds in each structure Y, x$_2$ and t are double bonds in each structure Y, and t' is 0 in each structure Y. In this embodiment, the compound has the chemical structure of Formula Ib$^{27}$:

(Formula Ib27)

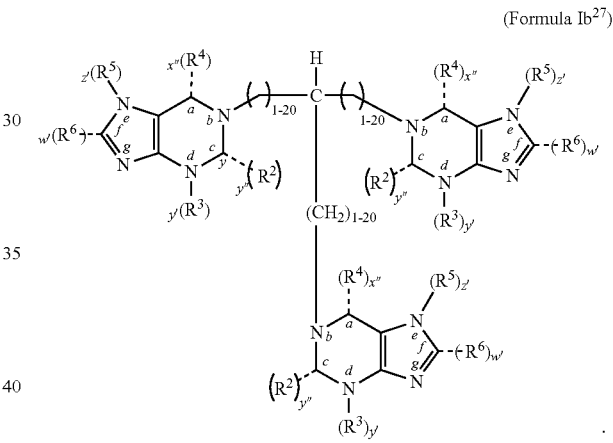

In one embodiment, the gas barrier enhancing additive is a compound having the chemical structure of Formula Ib$^{27}$, wherein z' and y' in each structure Y are 1, and R$_5$ and R$_3$ are C$_1$ alkyls, i.e. methyl groups. In this embodiment, the compound has the chemical structure of Formula Ib$^{28}$:

(Formula Ib28)

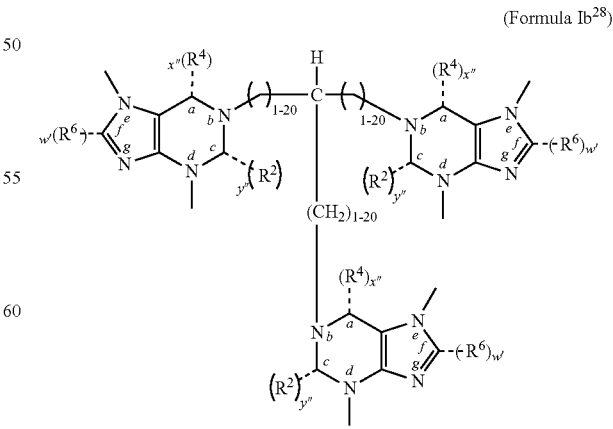

In one embodiment, the gas barrier enhancing additive is a compound having the chemical structure of Formula Ib$^{27}$, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ib$^{29}$:

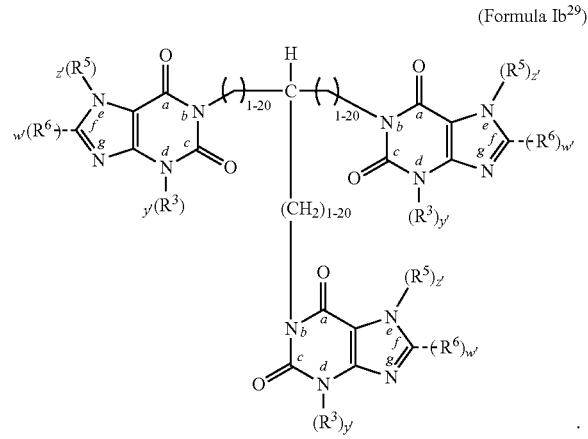

(Formula Ib$^{29}$)

In one embodiment, the gas barrier enhancing additive is a compound having the chemical structure of Formula Ib$^{29}$, wherein x' and y' in each structure Y are 1, and $R_1$ and $R_3$ are $C_1$ alkyls, i.e. methyl groups. In this embodiment, the compound has the chemical structure of Formula Ib$^{30}$:

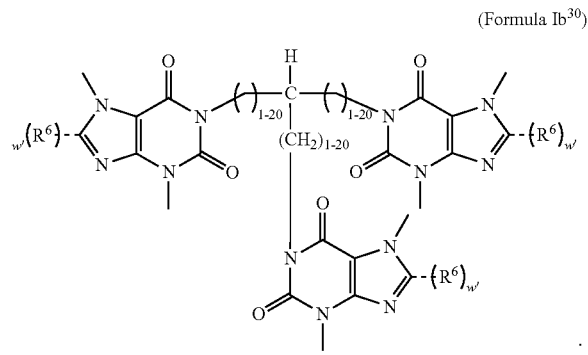

(Formula Ib$^{30}$)

In one embodiment, the gas barrier enhancing additive is a compound having the chemical structure of Formula Ib$^{30}$, wherein w' is 1 in each structure Y, and $R_6$ is hydrogen in each structure Y. In this embodiment, the compound has the chemical structure of Formula Ib$^{31}$:

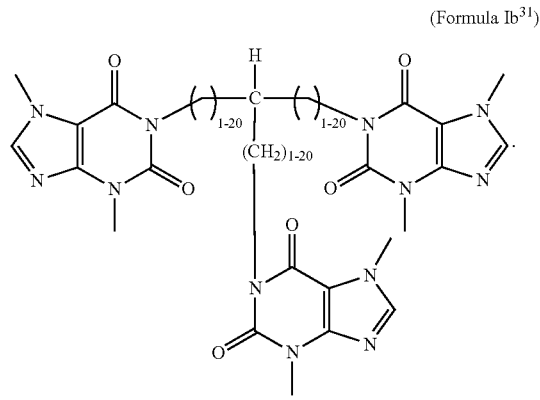

(Formula Ib$^{31}$)

In one embodiment, the gas barrier enhancing additive is a compound having the chemical structure of Formula Ib$^{22}$, wherein A, A', and A''' are, independently of each other, a $C^1$-$C^{20}$ hydrocarbyl having the formula —$(C_{1-20}H_{2-40})$—. In this embodiment, the compound has the chemical structure of Formula Ib$^{32}$:

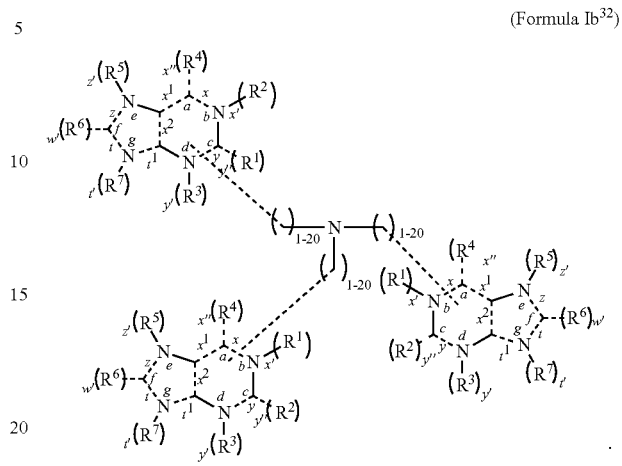

(Formula Ib$^{32}$)

In one embodiment, the gas barrier enhancing additive is a compound having the chemical structure of Formula Ib$^{32}$, wherein x' is 0 in each structure Y, and $C_1$-$C_{20}$ hydrocarbyl is singly bonded to atom b in each respective structure Y. In this embodiment, the compound has the chemical structure of Formula Ib$^{33}$:

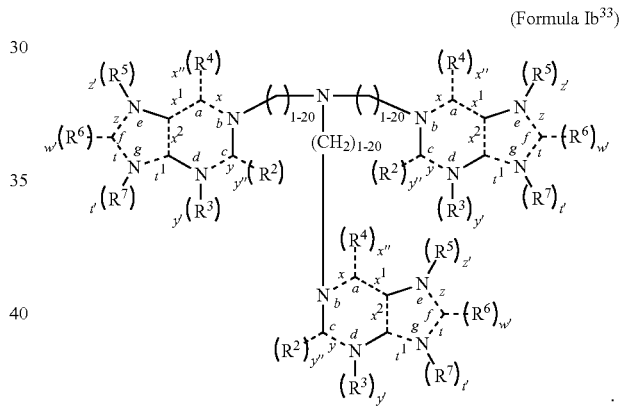

(Formula Ib$^{33}$)

In one embodiment, the gas barrier enhancing additive is a compound having the chemical structure of Formula Ib$^{33}$, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ib$^{34}$:

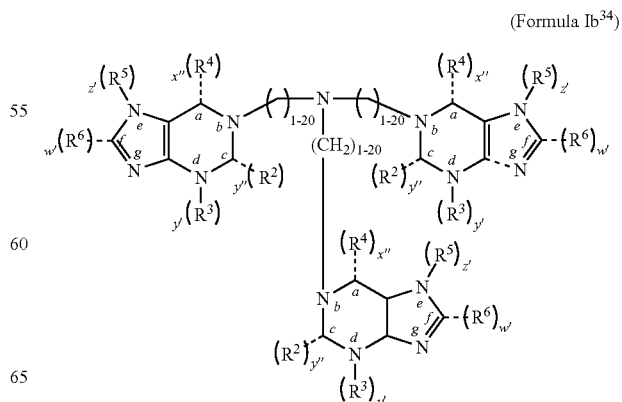

(Formula Ib$^{34}$)

In one embodiment, the gas barrier enhancing additive is a compound having the chemical structure of Formula Ib[34], wherein z' and y' in each structure Y are 1, and $R_5$ and $R_3$ are $C_1$ alkyls, i.e. methyl groups. In this embodiment, the compound has the chemical structure of Formula Ib[35]:

(Formula Ib[35])

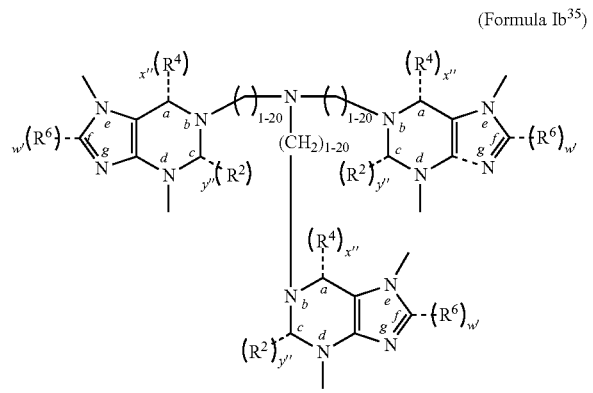

In one embodiment, the gas barrier enhancing additive is a compound having the chemical structure of Formula Ib[35], wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ib[36]:

(Formula Ib[36])

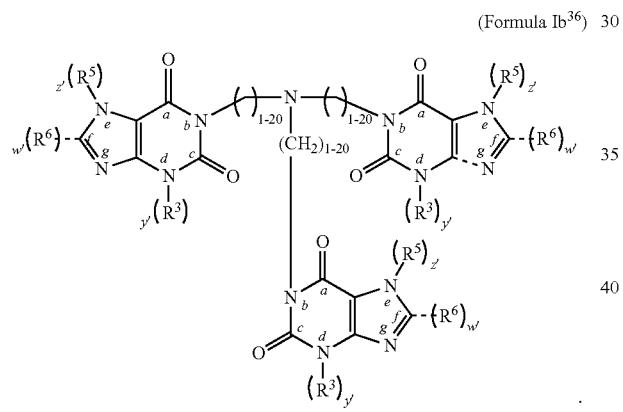

In one embodiment, the gas barrier enhancing additive is a compound having the chemical structure of Formula Ib[36], wherein x' and y' in each structure Y are 1, and $R_1$ and $R_3$ are $C_1$ alkyls, i.e. methyl groups. In this embodiment, the compound has the chemical structure of Formula Ib[37]:

(Formula Ib[37])

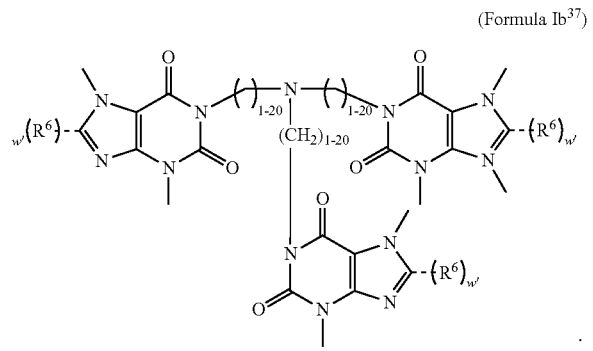

In one embodiment, the gas barrier enhancing additive is a compound having the chemical structure of Formula Ib[37], wherein w' is 1 in each structure Y, and $R_6$ is hydrogen in each structure Y. In this embodiment, the compound has the chemical structure of Formula Ib[38]:

(Formula Ib[38])

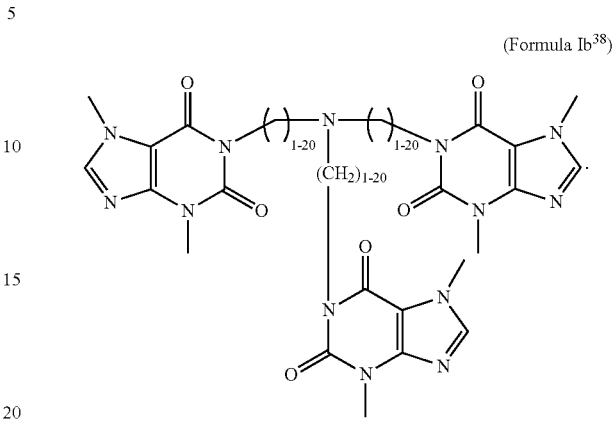

In some embodiments, the gas barrier enhancing additive is a compound having the chemical structure of Formula I, wherein p is 1 and m is 0. Therefore, the purine derivatives of these embodiments have the generic structure of Formula Ic:

(Formula Ic)

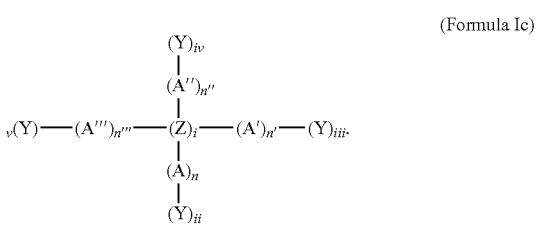

In certain embodiments, the gas barrier enhancing additive is a compound having the chemical structure of Formula Ic, wherein v and n''' are 1, and, in these certain embodiments, (A''') may be singly or doubly bonded to atoms a, c, or f of $(Y)_v$, or singly bonded to atoms b, d, e, or g of $(Y)_v$. When, in these embodiments, (A''') is bonded to one of atoms a, b, c, d, e, f, or g, then x", x', y''', y', z', w', or t', respectively, in $(Y)_v$ is 0.

In other certain embodiments, the gas barrier enhancing additive is a compound having the chemical structure of Formula Ic, wherein iii and n' are 1, and, in these other certain embodiments, (A') may be singly or doubly bonded to atoms a, c, or f of $(Y)_{iii}$, or singly bonded to atoms b, d, e, or g of $(Y)_{iii}$. When, in these embodiments, (A') is bonded to one of atoms a, b, c, d, e, f, or g, then x", x', y''', y', z', w', or t', respectively, in $(Y)_{iii}$ is 0.

In still other certain embodiments, the gas barrier enhancing additive is a compound having the chemical structure of Formula Ic, wherein ii and n are 1, and, in these other certain embodiments, (A) may be singly or doubly bonded to atoms a, c, or f of $(Y)_{ii}$, or singly bonded to atoms b, d, e, or g of $(Y)_{ii}$. When, in these embodiments, (A) is bonded to one of atoms a, b, c, d, e, f, or g, then x", x', y''', y', z', w', or t', respectively, in $(Y)_{ii}$, is 0.

In still other certain embodiments, the gas barrier enhancing additive is a compound having the chemical structure of Formula Ic, wherein iv and n" are 1, and, in these other certain embodiments, (A″) may be singly or doubly bonded to atoms a, c, or f of $(Y)_{iv}$, or singly bonded to atoms b, d, e, or g of $(Y)_{iv}$. When, in these embodiments, (A″) is bonded to one of atoms a, b, c, d, e, f, or g, then x″, x′, y″, y′, z′, w′, or t′, respectively, in $(Y)_{iv}$ is 0.

Therefore, in some embodiments, the gas barrier enhancing additive is a compound having the chemical structure of Formula Ic, wherein, v, n‴, iii, n′, ii, n, iv, and n″ are 1. In these embodiments, the compound may have one of the following generic structures:

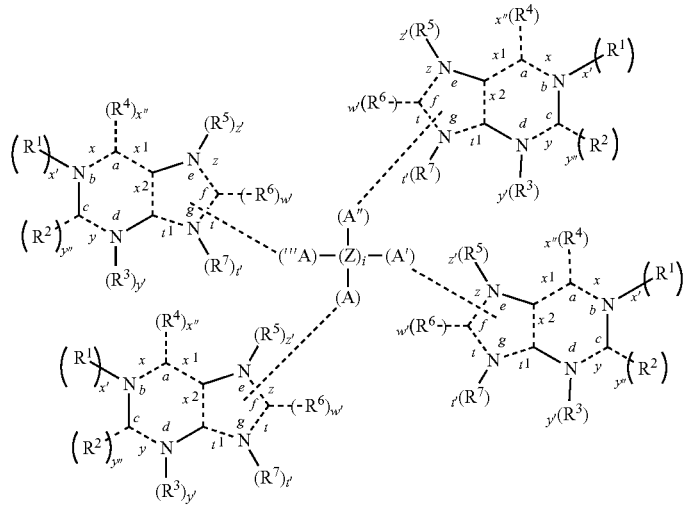

(Formula Ic$^i$)

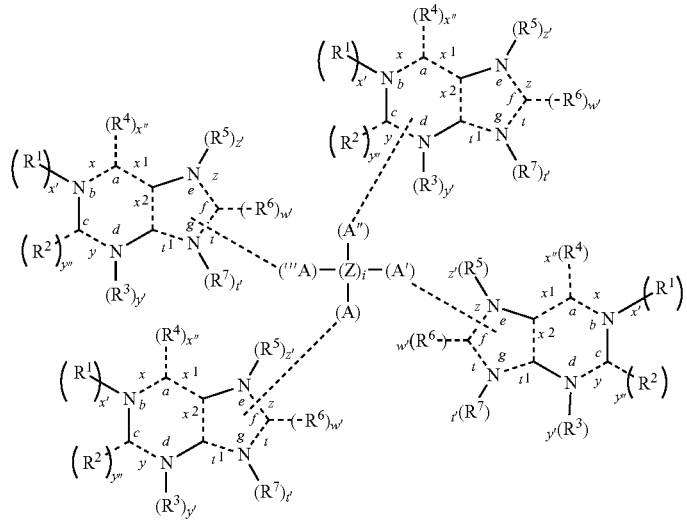

(Formula Ic$^{ii}$)

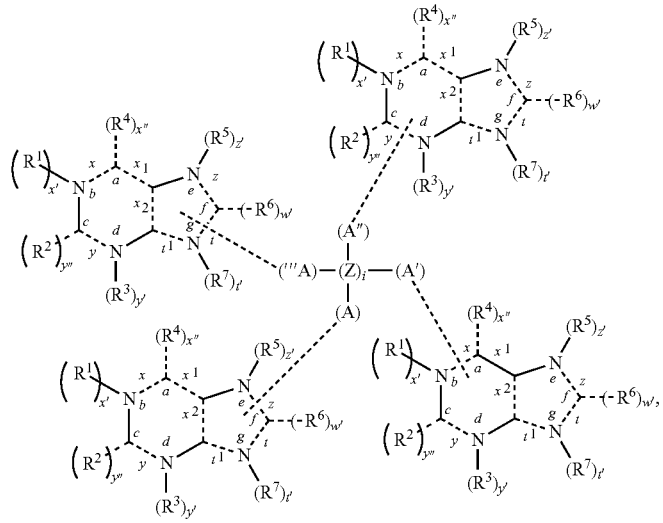

(Formula Ic$^{iii}$)

(Formula Ic$^{iv}$)

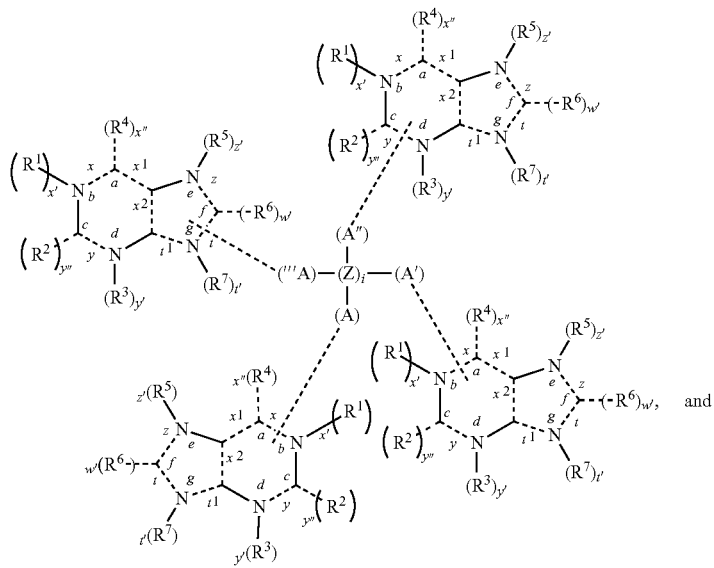

and (Formula Ic$^{v}$)

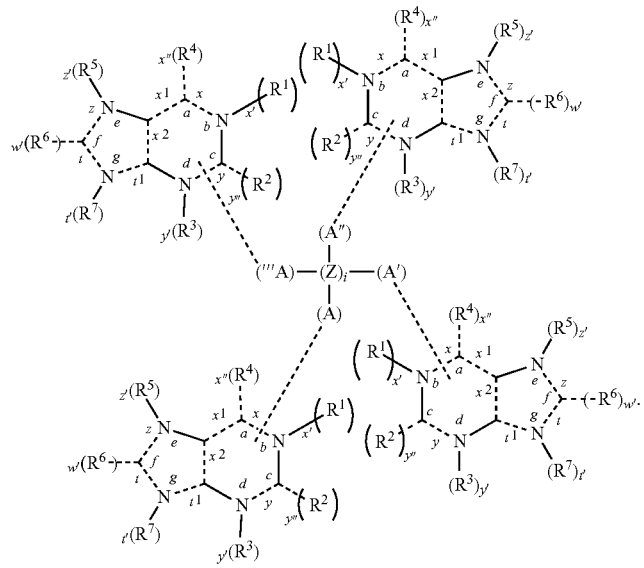

In some embodiments, the gas barrier enhancing additive is a compound having the chemical structure of Formula Ic$^{i}$, Formula Ic$^{ii}$, Formula Ic$^{iii}$, Formula Ic$^{iv}$, or Formula Ic$^{v}$, wherein i is 1, Z is a carbon atom, and A, A', A", and A"', independently of each other, are $C_1$-$C_{20}$ hydrocarbyls. In these embodiments, the compound may have one of the following structures:

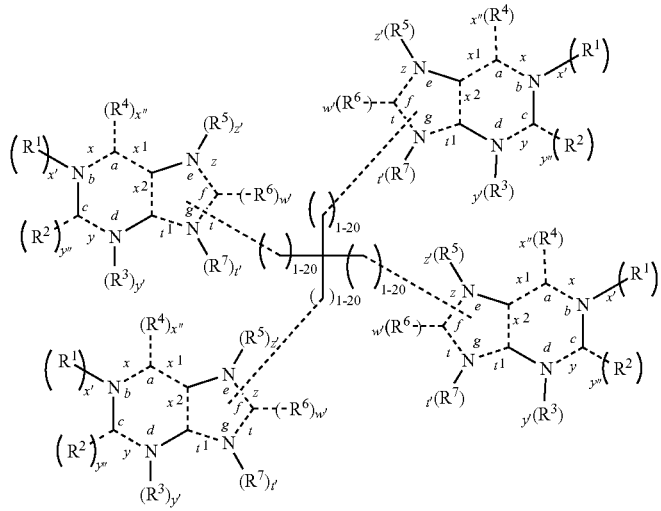
(Formula Ic¹)
(Formula Ic²)
(Formula Ic³)

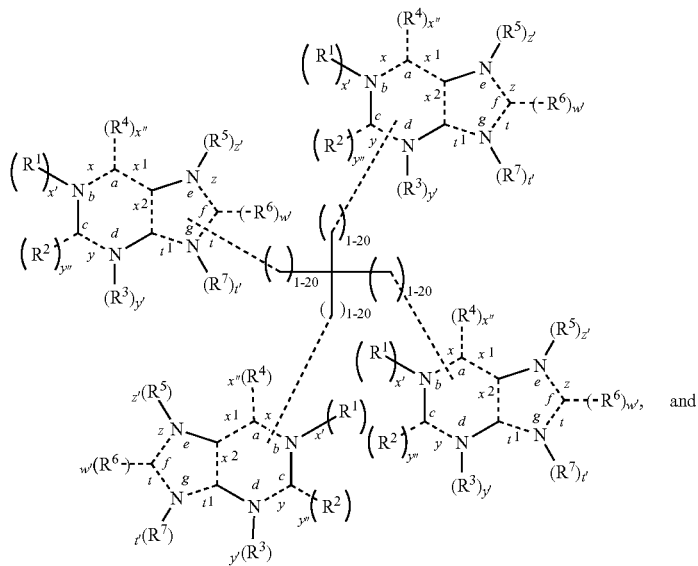
(Formula Ic⁴)
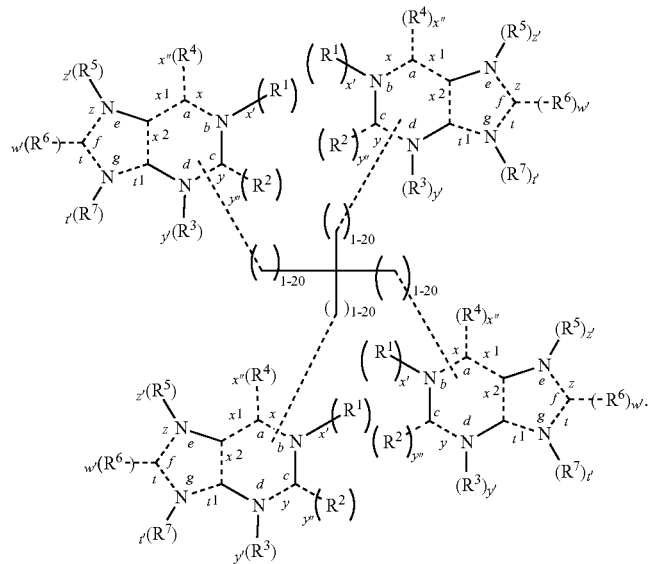
(Formula Ic⁵)
In one embodiment, the gas barrier enhancing additive is a compound having the chemical structure of Formula Ic⁵, wherein x' is 0 in each structure Y, and $C_1$-$C_{20}$ hydrocarbyl is singly bonded to atom b in each respective structure Y. In this embodiment, the compound has the chemical structure of Formula Ic⁶:

(Formula Ic⁶)

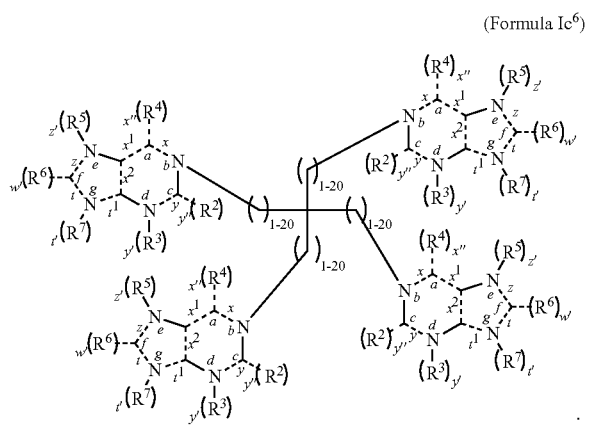

In one embodiment, the gas barrier enhancing additive a compound having the chemical structure of Formula Ic⁶, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ic⁷:

(Formula Ic⁷)

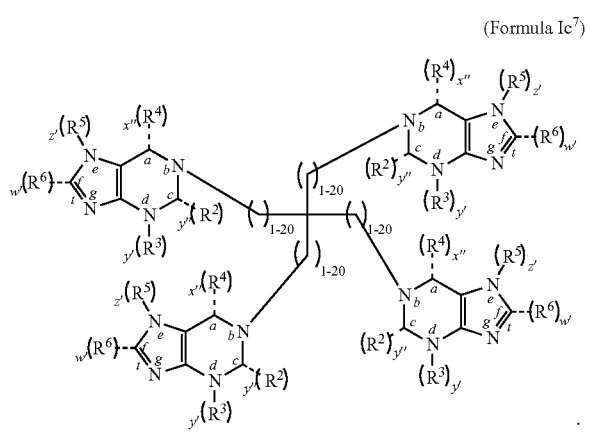

In one embodiment, the gas barrier enhancing additive is a compound having the chemical structure of Formula Ic⁷, wherein z' and y' in each structure Y are 1, and $R_5$ and $R_3$ are $C_1$ alkyls, i.e. methyl groups. In this embodiment, the compound has the chemical structure of Formula Ic⁸:

(Formula Ic⁸)

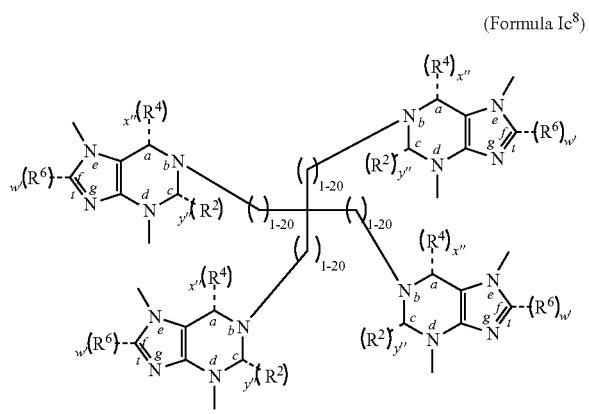

In one embodiment, the gas barrier enhancing additive is a compound having the chemical structure of Formula Ic⁷, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ic⁹:

(Formula Ic⁹)

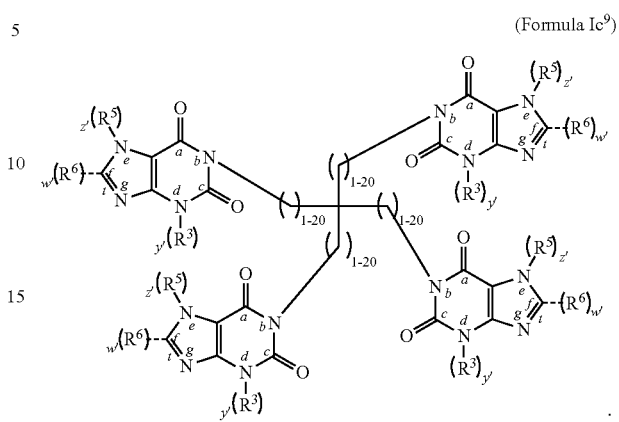

In one embodiment, the gas barrier enhancing additive is a compound having the chemical structure of Formula Ic⁹, wherein x' and y' in each structure Y are 1, and $R_1$ and $R_3$ are $C_1$ alkyls, i.e. methyl groups. In this embodiment, the compound has the chemical structure of Formula Ic¹⁰:

(Formula Ic¹⁰)

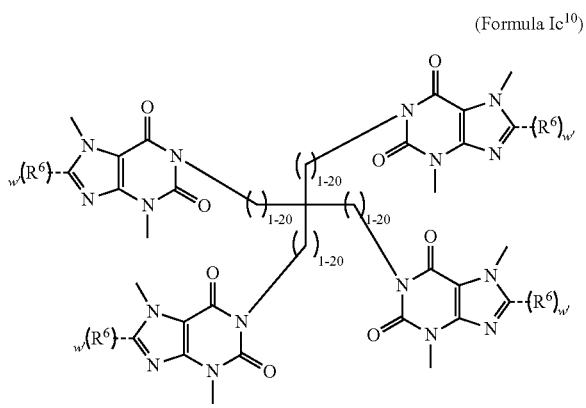

In one embodiment, the gas barrier enhancing additive is a compound having the chemical structure of Formula Ic¹⁰, wherein w' is 1 in each structure Y, and $R_6$ is hydrogen in each structure Y. In this embodiment, the compound has the chemical structure of Formula Ic¹¹:

(Formula Ic¹¹)

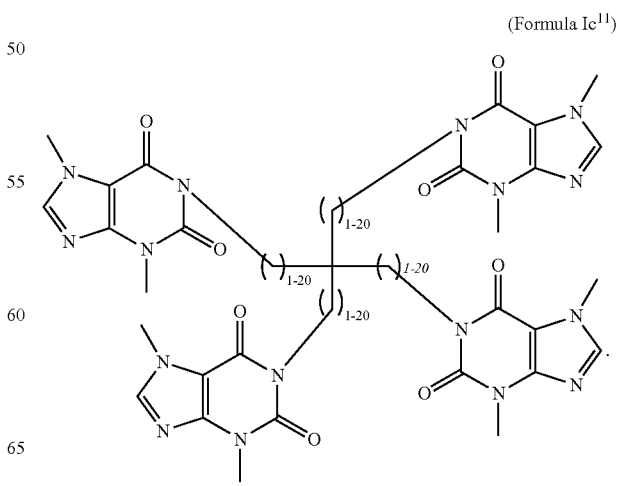

In one embodiment, the gas barrier enhancing additive is a compound having the chemical structure of Formula Ic$^1$, wherein z' is 0 in each structure Y, and each $C_1$-$C_{20}$ hydrocarbyl is singly bonded to atom e in each respective structure Y. In this embodiment, the compound has the chemical structure of Formula Ic$^{12}$:

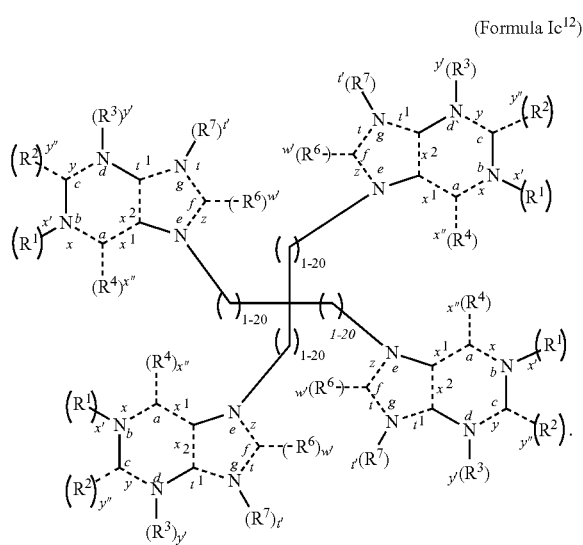

(Formula Ic$^{12}$)

In one embodiment, the gas barrier enhancing additive is a compound having the chemical structure of Formula Ic$^{12}$, wherein z, $t_1$, y, x, and $x_1$ are single bonds in each structure Y, $x_2$ and t are double bonds in each structure Y, and t' is 0 in each structure Y. In this embodiment, the compound has the chemical structure of Formula Ic$^{13}$:

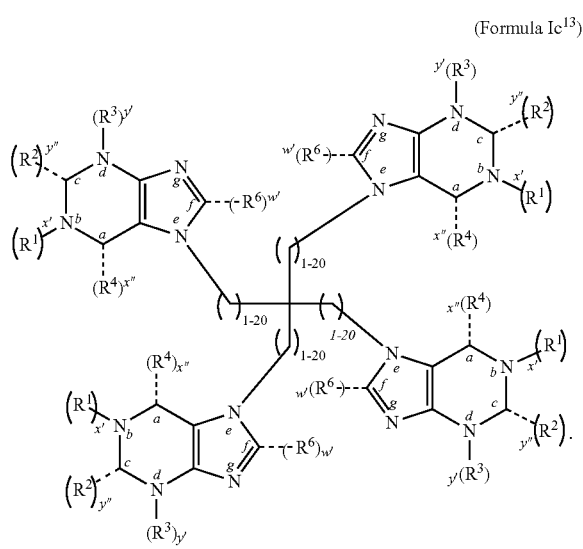

(Formula Ic$^{13}$)

In one embodiment, the gas barrier enhancing additive is a compound having the chemical structure of Formula Ic$^{13}$, wherein x' and y' in each structure Y are 1, and $R_1$ and $R_3$ are $C_1$ alkyls, i.e. methyl groups. In this embodiment, the compound has the chemical structure of Formula Ic$^{14}$:

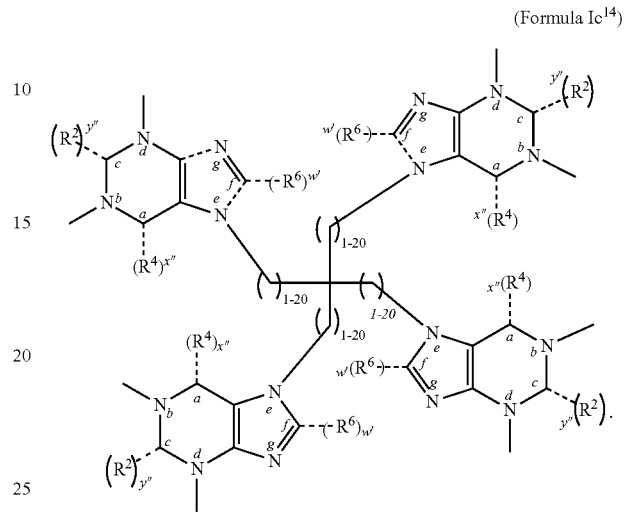

(Formula Ic$^{14}$)

In one embodiment, the gas barrier enhancing additive is a compound having the chemical structure of Formula Ic$^{13}$, wherein x" and y" in each structure Y are 1, and $R_2$ and $R_4$ are, in each structure Y, oxygen atoms that are doubly bonded to atoms c and a, respectively. In this embodiment, the compound has the chemical structure of Formula Ic$^{15}$:

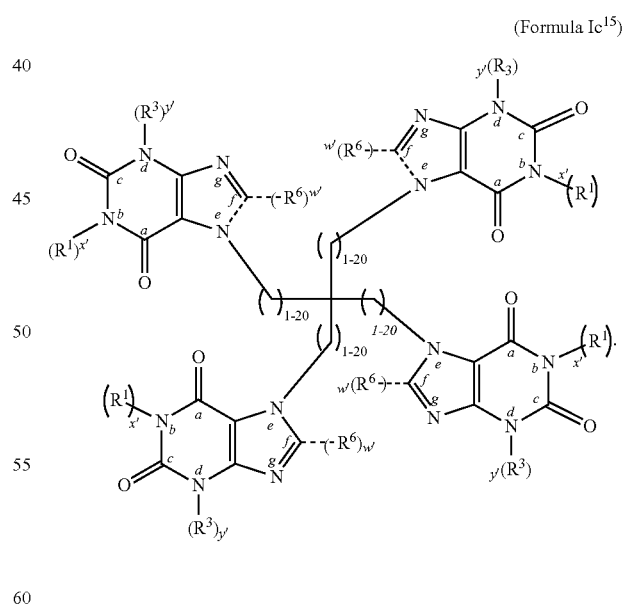

(Formula Ic$^{15}$)

In one embodiment, the gas barrier enhancing additive is a compound having the chemical structure of Formula Ic$^{15}$, wherein x' and y' in each structure Y are 1, and $R_1$ and $R_3$ are $C_1$ alkyls, i.e. methyl groups. In this embodiment, the compound has the chemical structure of Formula Ic$^{16}$:

(Formula Ic16)

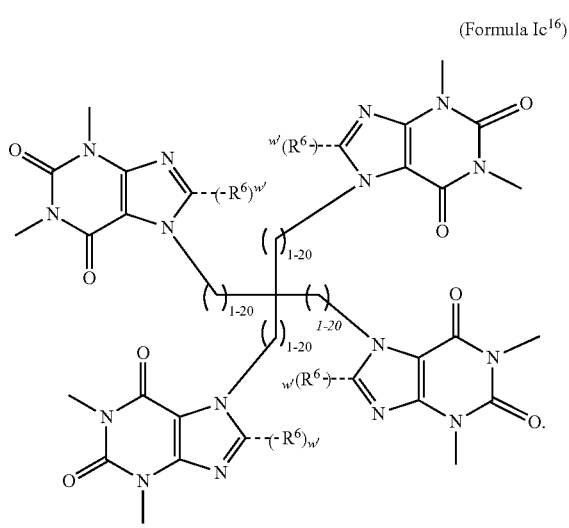

In one embodiment, the gas barrier enhancing additive is a compound having the chemical structure of Formula Ic$^{16}$, wherein w' is 1 in each structure Y, and R$_6$ is hydrogen in each structure Y. In this embodiment, the compound has the chemical structure of Formula Ic$^{17}$:

(Formula Ic17)

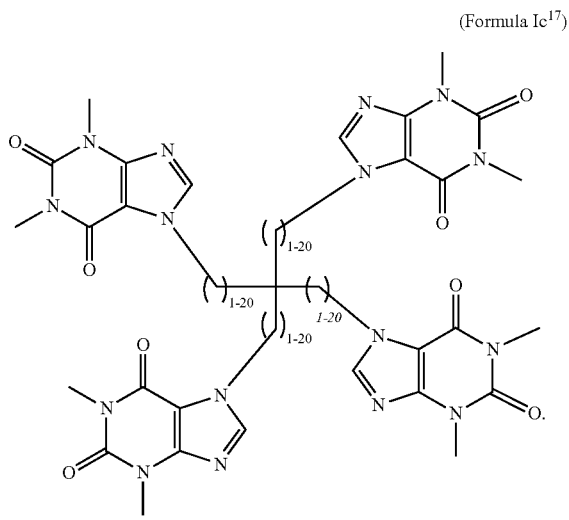

In some embodiments, the gas barrier enhancing additive is a compound having the chemical structure of Formula I, wherein p is 2-50 and iv is 0. Therefore, the gas barrier enhancing additives of these embodiments have the generic structure of Formula Id:

(Formula Id)

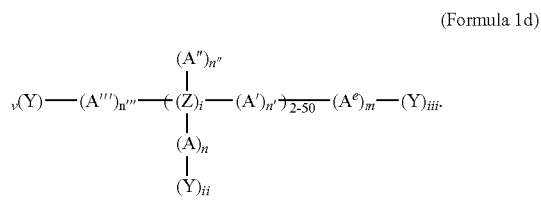

In another embodiment, the gas barrier enhancing additive has a molecular weight greater than caffeine, i.e., greater than about 194 g/mole. In a particular embodiment, the gas barrier enhancing additive has a molecular weight of from about 385 to about 1000 g/mol. In a specific embodiment, the gas barrier enhancing additive has a molecular weight of from about 400 to about 490 g/mol, from about 410 to about 480 g/mol, from about 420 to about 470 g/mol, from about 430 to about 460 g/mol or from about 440 to about 450 g/mol.

In a further embodiment, the gas barrier enhancing additive is a purine derivative selected from the group consisting of purine dimers, trimers and tetramers.

In a specific embodiment, the gas barrier additive is a purine dimer, e.g., a caffeine dimer. In another specific embodiment, the polyester composition of the present invention comprises a purine trimer, e.g., a caffeine trimer. In a still further specific embodiment, the gas barrier additive is a purine tetramer, e.g., a caffeine tetramer.

The gas barrier enhancing additives of the present invention may be synthesized by any suitable method. Examples 1 and 2 provide representative but non-limiting synthetic routes to purine derivatives of the present invention.

In one embodiment, the gas barrier enhancing additive exhibits low volatility. In a specific embodiment, the gas barrier enhancing additive is less volatile than caffeine. The volatility of caffeine can make processing a challenge (sublimation point of 178° C., melting point of 238° C.) since rapid volatilization may produce plate-out on tools, increase occupational exposure, and make for an unacceptable level of migration in finished bottles. Polyester compositions containing caffeine are plasticizers from a mechanical property perspective. Polyester compositions containing caffeine may also influence the uptake and saturation level of moisture in the composition, which also contributes to the plasticization effect responsible for the creep observed.

Volatility of solids can be measured as the vapor pressure of the solid at a temperature of interest. Vapor pressure can be determined by thermogravimetric analysis (TGA). Under specific pressure and temperature conditions, the rate of mass loss is directly proportional the vapor pressure of the solid, provided that the material is truly isolated in the vapor phase and does not undergo any association or interactions. If the vapor is continually moved or flushed in a manner such that the vapor never reaches saturation, then the material will sublime until it has completely vaporized. The same conditions will be present in the case where a temperature differential exists such that the material will sublime and then immediately condense back to a solid at a significantly cooler location. The key is to ensure that the vapor does not reach a saturation level. The basic equation for the relation of mass loss from TGA to vapor pressure is a modified Langmuir equation:

$$-\frac{dm}{dt} = p\alpha\sqrt{\frac{M}{2\pi RT}}$$

Where M is the molar mass of the subliming molecule, R is the ideal gas constant, T is the absolute temperature, p is the vapor pressure and α is the vaporization coefficient (usually assumed to be 1 for tests done in vacuum). If a vacuum is not used, then the value of α must be determined (it will be non-unity, though stay constant for the particular instrument and gas flow conditions). Thus, it becomes difficult to determine both p and α from a single set of experiments unless we can simplify the definitions and relate them to either known quantities or easily measured quantities.

Caffeine provides a calibration curve for a specific instrument within a known temperature range according to the following:

$$\ln P = a(\ln(dm/dt)) + b$$

Where P is the partial pressure caffeine and a and b are constants that describe the instrument. Therefore, a simple plot of the slope of the mass loss at some constant temperature can be used to give the vapor pressure of any compound. For calibration purposes, data on the vapor pressure of caffeine can be found in a review by Emel'yaneko *J. Chem. Thermodynamics*, 40, 2008, pg. 1661-1665. Example 3 provides a procedure for calculation of the instrument constants.

To determine the vapor pressure of a solid, a temperature profile similar to that used above, with the temperature values chosen to be within the range of interest. It is important that separate experiments be run below and above the melting point as the interpretation of the data can be complicated by the fact that enthalpies of sublimation and vaporization have different values.

Once the vapor pressure as a function of temperature has been determined, comparison against known materials can provide insight into the propensity of an additive to plate out onto tools during processing. Additionally, we can determine the enthalpy of vaporization or sublimation using the Clasius-Claperon equation:

$$\ln p = B - \frac{\Delta H}{RT}$$

For temperatures above the melting point, the $\Delta H_{vap}$ is determined; the $\Delta H_{sublimation}$ is determined for temperatures below the melting point. A plot of the ln p versus 1/T will yield a slope equal to $-\Delta H/R$ and an intercept equal to the Clasius constant, B. The value of R will determine the units for $\Delta H$. Furthermore, it is important to use absolute temperatures (Kelvin) in this analysis.

A comparison of the enthalpies of pure compounds versus compounds in PET matrices permits evaluation of the effect of compounding of the material, as well as the effects on equilibrium concentrations and diffusion rates.

Examples 4 and 5 provide data on the volatility of various gas barrier enhancing additives disclosed herein.

In one embodiment, the vapor pressure of the gas barrier enhancing additive at 260° C. is lower than the vapor pressure of caffeine. At 160° C., the vapor pressure of caffeine is about 36 Pa, for example. In a specific embodiment, the vapor pressure of the additive at 260° C. is less than about 25 Pa, less than about 20 Pa, less than about 15 Pa, less than about 10 Pa, less than about 5 Pa, less than about 1 Pa or about zero (o) Pa. In a preferred embodiment, the vapor pressure of the additive is 0 Pa, i.e., it is not volatile.

In one embodiment, the present invention is a polyester composition comprising a polyester and a non-volatile purine derivative.

In another embodiment, the present invention is a polyester composition comprising a polyester and a purine derivative having a vapor pressure of less than about 25 Pa.

In a further embodiment, the present invention is a polyester composition comprising a polyester and a purine derivative having a vapor pressure of less than about 20 Pa.

In a still further embodiment, the present invention is a polyester composition comprising a polyester and a purine derivative having a vapor pressure of less than about 10 Pa.

In yet a further embodiment, the present invention is a polyester composition comprising a polyester and a purine derivative having a vapor pressure of less than about 5 Pa.

In yet another embodiment, the present invention is a polyester composition comprising a polyester and a purine derivative having a vapor pressure of less than about 5 Pa.

In a specific embodiment, the present invention is a polyester composition comprising a PET copolymer and a non-volatile purine derivative.

III. Containers

The polyester compositions of the present invention can be used to form polyester containers. Suitable containers include, but are not limited to, bottles, drums, carafes, coolers, and the like. In one embodiment, the polyester container is used to store a food or beverage. In a specific embodiment, the polyester container is used to store a carbonated beverage such as a carbonated soft drink.

As is well known to those skilled in the art, containers can be made by blow molding a container preform. Examples of suitable preform and container structures are disclosed in U.S. Pat. No. 5,888,598, the disclosure of which is expressly incorporated herein by reference in its entirety.

Figures 2, 3, 4:
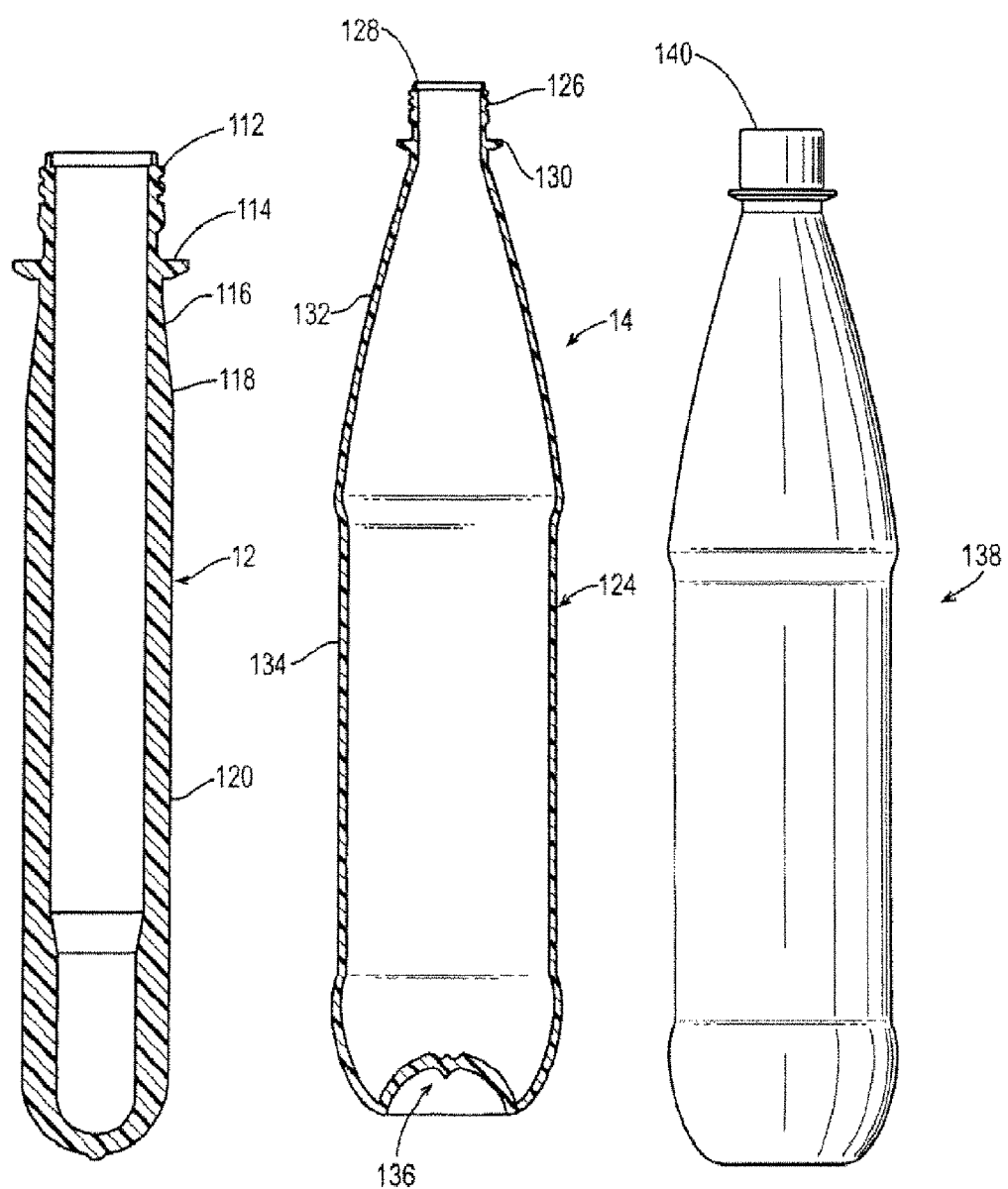
FIG. 2 is a sectional elevation view of a molded container preform made in accordance with an embodiment of the present invention.
FIG. 3 is a sectional elevation view of a blow molded container made from the preform of FIG. 2 in accordance with an embodiment of the present invention.
FIG. 4 is a perspective view of a packaged beverage made in accordance with an embodiment of the present invention.
Figure 5:
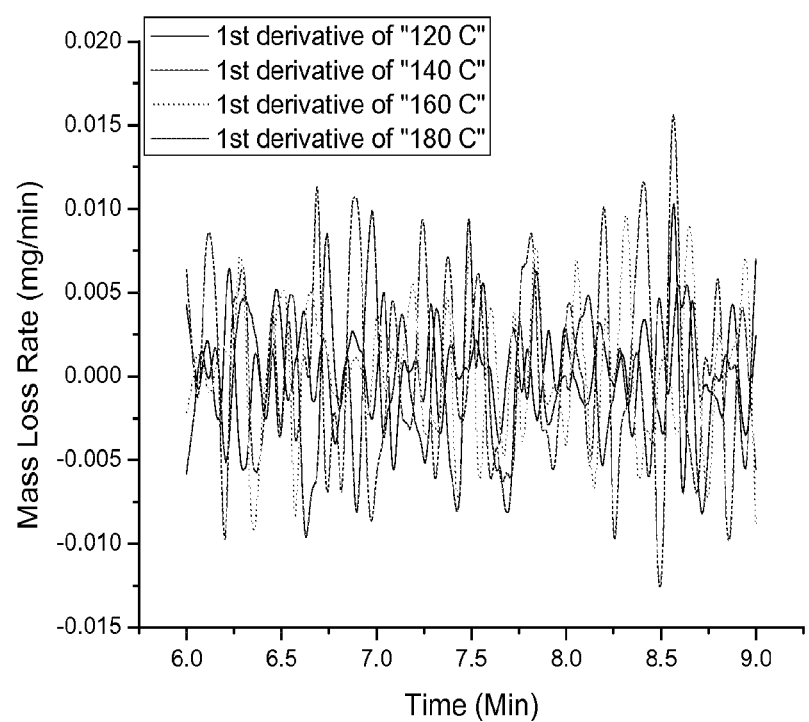
FIG. 5 shows mass loss curves of PET bottle resin (1101) at temperatures of 120 to 180° C.
Figure 6:
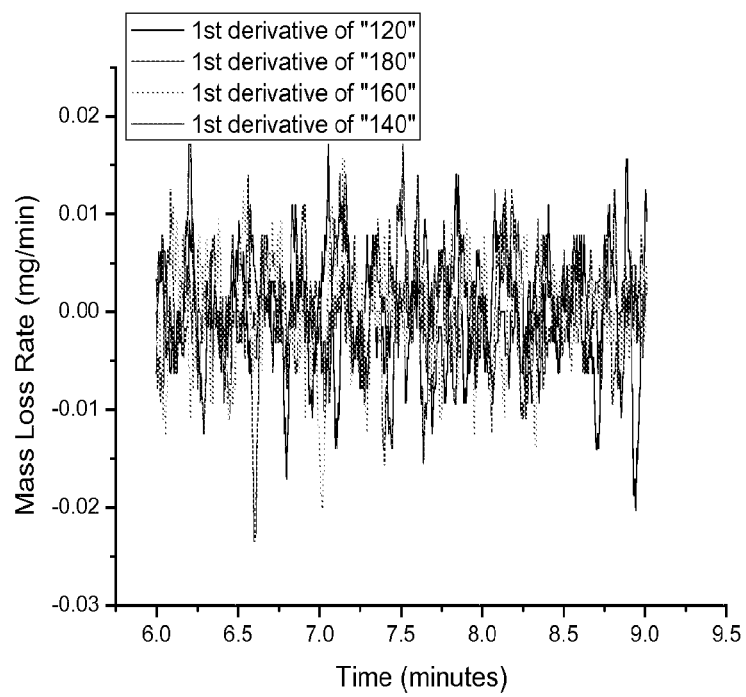
FIG. 6 shows mass loss curves of XCP-3 at temperatures of 120 to 180° C.
Figure 7:
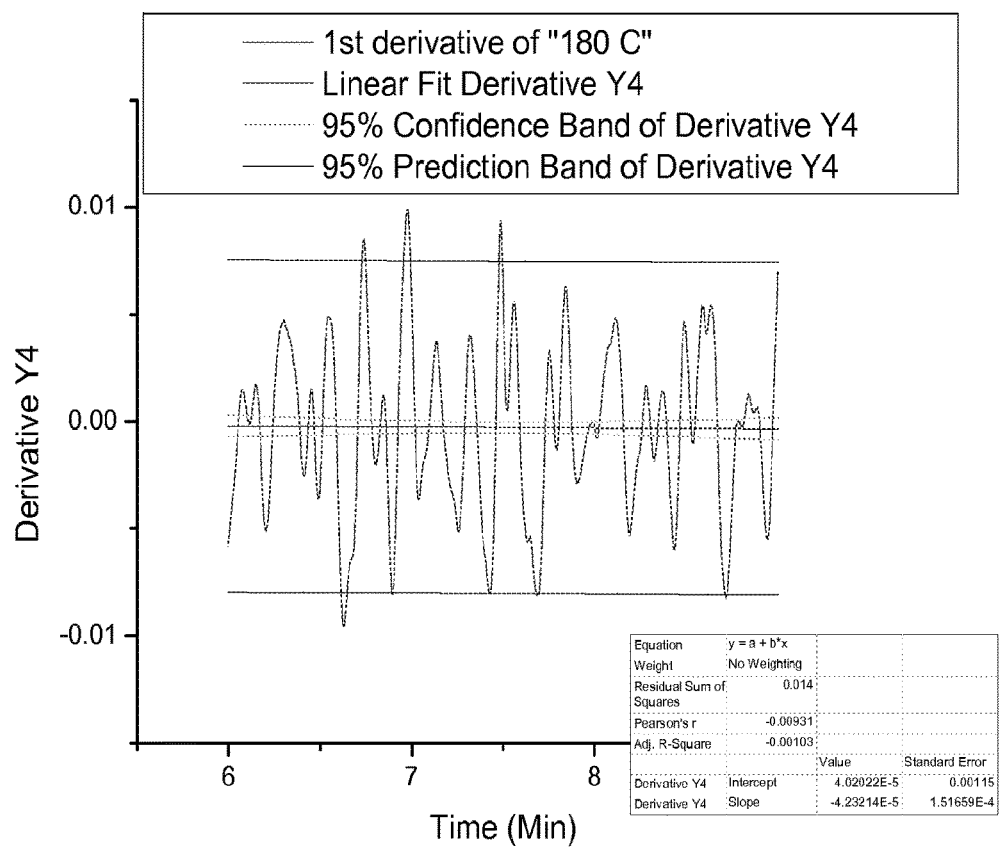
FIG. 7 shows mass loss curves at 180° C. The 95% prediction interval shows an indication of the range in which the data could represent the vapor pressure for PET resin. This data indicates ±0.008 mg/min, which translates to ±15 Pa at 180° C. It is therefore reasonable to assume that 15 Pa would be a cutoff for reliability of PET resin.

A polyester container preform 12 is illustrated in FIG. 2. This preform 12 is made by injection molding PET based resin and comprises a threaded neck finish 112 which terminates at its tower end in a capping flange 114. Below the capping flange 114, there is a generally cylindrical section 116 which terminates in a section 118 of gradually increasing external diameter so as to provide for an increasing wall thickness. Below the section 118 there is an elongated body section 120.

The preform 12 illustrated in FIG. 2 can be stretch blow molded to form a container 14 illustrated in FIGS. 3 and 4. The container 14 comprises a shell 124 comprising a threaded neck finish 126 defining a mouth 128, a capping flange 130 below the threaded neck finish, a tapered section 132 extending from the capping flange, a body section 134 extending below the tapered section, and a base 136 at the bottom of the container. The container 14 is suitably used to make a packaged beverage 138, as illustrated in FIG. 4. The packaged beverage 138 includes a beverage such as a carbonated soda beverage disposed in the container 14 and a closure 140 sealing the mouth 128 of the container.

The polyester container optionally may comprise a plurality of layers as described in co-pending patent application Ser. No. 11/850,575 filed on Sep. 15, 2006, entitled "Multilayer Container having Small Molecule Barrier Additives," the disclosure of which is expressly incorporated herein by reference in its entirety. A multilayer container can permit the use of additives in a barrier layer that normally would be too volatile for inclusion in a single layer container because the low molecular weight additive is contained within two outer layers without the low molecular weight additive, preventing contact between the low molecular weight additive and the surfaces of the injection molding apparatus.

Briefly described, a multilayer container comprises at least two outer layers comprising a polymer matrix and at least one barrier layer disposed between the at least two outer layers. The at least one barrier layer comprises a polyester composition comprising a polyester and a gas barrier enhancing additive. Desirably, the gas barrier enhancing additive is present in the multilayer container in an amount in the range of about 0.2 to about 10 weight percent of the container, the at least two outer layers comprise about 99 to about 20 weight percent of the container, and the one or more barrier layers comprise about 1 to about 80 weight percent of the container. In another particular embodiment, the multilayer container further comprises at least one intermediate layer between the at least one barrier layer and the at least two outer layers.

The preform 12, container 14, and packaged beverage 138 are but examples of applications using the preforms of the present invention. It should be understood that the process and apparatus of the present invention can be used to make preforms and containers having a variety of configurations.

In one embodiment, the polyester container of the present invention exhibits a desirable barrier improvement factor (BIF). The BIF is a measure of enhanced gas barrier properties (the ratio of the gas transmission rate of a polyester composition without an additive to the gas transmission rate of a polyester composition with an additive). In one embodiment, the polyester container exhibits a desirable BIF for oxygen ingress. In another embodiment, the polyester container exhibits a desirable BIF for carbonation retention.

In one embodiment, the BIF of the polyester container of the present invention is from about 1.0× to about 2.0× increased over a standard polyester container of the same wall thickness. In a specific embodiment, the BIF of the polyester container is about 1.1×, about 1.2×, about 1.3×, about 1.4×, about 1.5×, about 1.6×, about 1.7×, about 1.8× or about 1.9× increased over a standard polyester container of the same wall thickness.

In another embodiment, the polyester container of the present invention exhibits improvement in shelf-life in comparison to a standard polyester container. In one embodiment, the shelf life of the polyester container of the present invention is increased from about 1.0× to about 2.0× relative to a standard polyester container. In a specific embodiment, the shelf-life of the polyester container is about 1.1×, about 1.2×, about 1.3×, about 1.4×, about 1.5×, about 1.6×, about 1.7×, about 1.8×, or about 1.9× increased over a standard polyester container.

In a particular embodiment, the polyester container of the present invention exhibits improved gas barrier properties for oxygen, carbon dioxide or both oxygen and carbon dioxide. In one embodiment, oxygen permeation is reduced by about 10%, about 20%, about 30%, about 40%, about 50%, about 60%, about 70%, about 80 over a standard polyester container. In another embodiment, carbon dioxide permeation is reduced by a factor of about 10%, about 20%, about 30%, about 40%, about 50%, about 60%, about 70%, about 80% over a standard polyester container.

In another particular embodiment, the polyester container of the present invention exhibits a loss rate reduced by a factor of 0.95 over a standard polyester bottle, where loss rate is expressed as a % per week, such as, for example, about 0.90, about 0.85, about 0.80, about 0.75, about 0.70, about 0.65, about 0.60, about 0.55, about 0.50, about 0.45, about 0.40, about 0.35, about 0.30 or about 0.25.

In one embodiment, the shelf-life of the polyester container of the present invention is from about 10 weeks to about 20 weeks, about 11 weeks to about 19 weeks, about 12 weeks to about 18 weeks, about 13 weeks to about 17 weeks, about 14 weeks to about 16 weeks or about 15 weeks.

In a further embodiment, the purine derivative exhibits no noticeable effect on the high pressure creep of the polyester container of the present invention. In a particular embodiment, the natural stretch ratio (NSR) is similar to that of standard polyester container.

IV. Methods of Making Polyester Composition and Containers

As described above, the polyester composition of this invention is useful for making containers in which enhanced gas barrier is desirable. In short, such containers are made by forming the above described polyester compositions into the desired container by conventional methods.

The polyester is amenable to melt forming processes including, but are not limited to, injection molding, extrusion, thermal forming and compression molding. Injection molding describes a process whereby the polyester resin is heated to a temperature above its glass transition temperature and becomes molten. The molten polyester material is then injected into a mold. The molten polyester material fills the mold before cooling. The mold is then opened and the plastic article is released.

Methods for incorporating the gas barrier enhancing additive into the polyester composition are well known to those skilled in the art. For example, an additive can be fed directly into the polyester during the melt forming process, pre-blended with the polyester resin prior to melting forming, or incorporated at high concentrations with a polyester as masterbatch and then blended with the polyester resin prior to the melt forming process container.

Blow molding may be used to form hollow plastic containers. There are three general types of blow molding: extrusion blow molding, injection blow molding, and stretch blow molding The particularly preferred method for making the containers of this invention is stretch blow molding.

FIG. 1 illustrates a system 10 in accordance with an embodiment of this invention for making a rigid container preform 12 (illustrated in FIG. 2) and a rigid container 14 (illustrated in FIG. 3) from the preform. As is shown in FIG. 1, PET 20 and a gas barrier enhancing additive 22 are added to a feeder or hopper 24 that delivers the components to a hot melt extruder 26 in which the components are melted and blended. The hot melt extruder 26 then extrudes the molten mixture of PET 20 and gas barrier enhancing additive 22 into an injection molding device 28 to form the preform 12. The preform 12 is cooled and removed from the injection molding device 28 and delivered to a stretch blow molding device 30 which stretch blow molds the preform 12 into a finished rigid container 14.

The melt residence time of the preform production is preferably less than five minutes and more preferably from about one to about three minutes. The melt temperatures are desirably from about 270 to about 300° C. and more desirably from about 270 to about 290° C. The melt residence time begins when the PET 20 and gas barrier enhancing additive 22 enter the melt extruder 26 and start melting, and ends after injection of the molten blend into the injection mold to form the preform 12.

In a particular embodiment, the injection molding process can be modified by pressurizing the mold cavity to minimize plate-out, as described in the co-pending U.S. patent application entitled "Pressurized Tooling for Injection Molding and Method of Using," which is hereby incorporated by reference in its entirety, and was filed on Sep. 15, 2006, by Schultheis, et al. Pressurizing the mold cavity changes the dynamics of the processing cycle by reducing or completely eliminating the ability of additives to diffuse through the PET copolymer and deposit on the inner surface of the mold. The desired pressure of the mold cavity can be optimized for a particular polymer material, polymer matrix, or additive.

The modified injection molding process (not pictured) includes the additional step of pressurizing a mold by introducing a pressurized gas into a mold cavity in the mold, wherein the mold cavity defines the shape of the container preform; introducing a polyester composition into the mold cavity; cooling the polyester composition to form the container preform; and removing the container preform from the mold cavity.

The pressurized gas may be any gas that does not detrimentally affect the polyester composition. Non-limiting examples include air and its individual components, oxygen, nitrogen, and carbon dioxide; the noble gases, argon, neon, helium, and xenon; and mixtures thereof. In a particular embodiment, the mold cavity is pressurized to a pressure in the range of about 1 to about 1000 psig.

In one embodiment, the present invention is a method of forming a hollow plastic container comprising:
(i) providing a polyester resin material;
(ii) heating the polyester resin material to provide a molten resin;
(iii) adding a gas barrier enhancing additive to the molten resin;
(iv) introducing the molten resin into a mold;
(v) cooling the molten resin to form a preform;
(vi) removing the perform from the mold; and
(vi) blow molding the perform to form a hollow plastic container.

In another embodiment, the present invention is a method of forming a hollow plastic container comprising:
(i) providing a polyester resin material comprising a polyester and a gas barrier enhancing additive;
(ii) heating the polyester resin material to provide a molten resin;
(iii) introducing the molten resin into a mold;
(iv) cooling the molten resin to form a preform;
(v) removing the perform from the mold; and
(v) blow molding the perform to form a hollow plastic container.

In a particular embodiment, the polyester is PET or a PET copolymer.

In another particular embodiment, the gas barrier enhancing additive is selected from the group including compounds of Formula I, purine derivatives with a molecular weight higher than caffeine, purine derivatives with a molecular weight between about 380 and 500 g/mol, purine dimers, purine trimers, purine tetramers and/or non-volatile purine derivatives.

In a more particular embodiment, the loading of the gas barrier enhancing additive is from 2% to about 5%, such as, for example, about 2%, about 3%, about 4% or about 5%. In a preferred embodiment, XCP-3 loading in a preform or bottle is about 3%.

In a particular embodiment, the container is a PET bottle. In another particular embodiment, the container is a PET copolymer bottle.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description therein, may suggestion themselves to those skilled in the art without departing from the spirit of the present invention and/or the scope of the appended claims.

EXAMPLES

Example 1 General Preparation of (Alkanediyl)bis[theophylline]

A 1 mmol/10 mL concentration solution of theophylline in anhydrous dimethylformamide (DMF) was prepared under an inert gas atmosphere and dry conditions. For one equivalent of theophylline, an equimolar amount of sodium hydride was carefully added to the solution, followed by one half an equivalent of dibromoalkane. The dibromoalkanes included dibromopropane, dibromobutane, and dibromooctane.

The mixture was stirred at ambient temperature (~22° C.) for 15 hours, then heated and stirred at 70° C. for three hours. The progress of the reactions was monitored using thin-layer chromatography (TLC), by confirming the consumption of the starting materials. The resulting mixture was poured into water to produce a solid mass of the product compound. The product was further purified by column chromatography, which yielded a pure, white, amorphous compound.

Example 2 Preparation of MU2951-12

Formula $C_{16}H_{18}N_8O_4$, molecular weight: 386.4, Standard name: 7-[4-(1,3-dimethyl-2,6-dioxide-2,3,6,7-4H-1H-purine-7-yl)ethyl]-1,3-dimethyl-2,3,6,7-4H-1H-purine-2,6-dione:

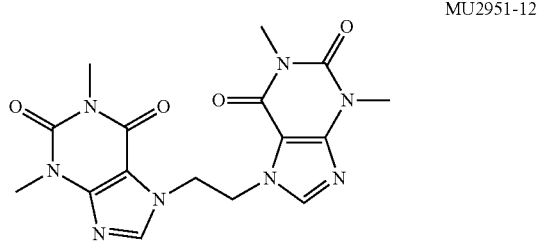 [SMILES: Cn1c(=O)c2c(ncn2CCn2cnc3c2c(=O)n(C)c(=O)n3C)n(C)c1=O]

MU2951-12

Procedure 1:

72 g theophylline (400 mmol), 0.16 g KI and 360 ml pure water were added sequentially to a 1000 ml four mouth flask. The mixture was stirred and heated to 50° C. and incubated for 60 minutes. The pH of the mixture was then adjusted to 14 with a 30% liquid alkaline. After pH 14 was reached, the mixture was heated to 60° C. 19.8 g (200 mmol) of 1,2-dichloroethane was then added dropwise over a period of 3 hours and the mixture was incubated for 48 hours. The mixture was then filtered, washed with water and vacuum filtered to provide MU2951-12 (46.7 g dry weight, 60.4% yield).

Procedure 2:

72 g theophylline (400 mmol), 2.0 g KI and 500 ml DMF were added sequentially to a 1000 ml four mouth flask. The mixture was stirred and heated to 85° C. and incubated for 40 minutes. 34.6 g $K_2CO_3$ (250 mmol) was added. The mixture was heated to 98° C., then 37.6 g (200 mmol) of 1,2-dibromoethane was added dropwise over 0.5 hours and the mixture was incubated for 10 hours. The mixture was then filtered, washed with water and filtered to provide MU2951-12 (48.9 g dry weight, 63.3% yield).

Example 3: Preparation of Compound 2

Formula $C_{17}H_{20}N_8O_4$, molecular weight: 400.4, Standard name: 7-[4-(1,3-dimethyl-2,6-dioxide-2,3,6,7-4H-1H-purine-7-yl)propyl]-1,3-dimethyl-2,3,6,7-4H-1H-purine-2,6-dione Compound 2

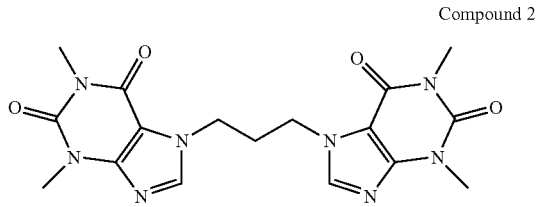 [SMILES: Cn1c(=O)c2c(ncn2CCCn2cnc3c2c(=O)n(C)c(=O)n3C)n(C)c1=O]

Procedure 1:

72 g theophylline (400 mmol), 0.16 g KI and 400 ml pure water were added sequentially to a 1000 ml four mouth flask. The mixture was stirred and heated to 50° C. and incubated for 60 minutes. The pH of the mixture was adjusted to 12 with a 30% liquid alkaline. Once the pH was adjusted, the mixture was heated to 60° C. 22.6 g (200 mmol) of 1,3-dichloropropane was added in one portion and the mixture was incubated for 48 hour at 60° C. The mixture was filtered, washed with water and filtrated to provide Compound 2 (50.9 g, dry weight 50.9 g, 63.6% yield).

Procedure 2:

72 g theophylline (400 mmol), 2.0 g KI and 900 ml DMF were added sequentially to a 2000 ml four mouth flask. The mixture was stirred and heated to 85° C. and incubated for 40 minutes. 69.1 g K$_2$CO$_3$ (500 mmol) was then added. The mixture was heated to 98° C., then 80.8 g (400 mmol) of 1,3-dibromopropane was added dropwise over 0.5 hours. The mixture was then incubated for 10 hours. The mixture was filtered, washed with water and filtrated to provide Compound 2 (54.2 g dry weight, 67.7% yield).

Example 4: Preparation of XCP-3

C$_{18}$H$_{22}$N$_8$O$_4$ Formula C$_{18}$H$_{22}$N$_8$O$_4$, molecular weight: 414.4, Standard name: 7-[4-(1,3-dimethyl-2,6-dioxide-2,3,6,7-4H-1H-purine-7-yl)butyl]-1,3-dimethyl-2,3,6,7-4H-1H-purine-2,6-dione

XCP-3

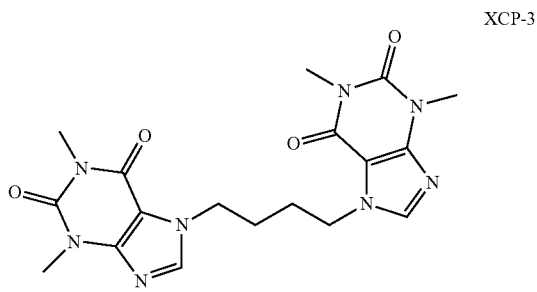 [SMILES: Cn1c(=O)c2c(ncn2CCCCn2cnc3c2c(=O)n(C)c(=O)n3C)n(C)c1=O]

Procedure 1:

36 g theophylline (200 mmol), 1.6 g KI and 720 ml pure water were added sequentially to a 1000 ml four mouth flask. The mixture was stirred and heated to 70° C. and incubated for 60 minutes. The pH of the mixture was adjusted to pH 9 with a 30% liquid alkaline (30% sodium hydroxide in water). The mixture was then heated to 90° C., and 43.2 g (200 mmol) of 1,4-dibromobutane was added dropwise over 4 hours. The mixture was incubated for 36 hours at 90° C. The mixture was filtered, washed with water and filtrated to provide XCP-3 (33.1 g dry weight, 80.1% yield).

Procedure 2:

36 g theophylline (200 mmol), 0.3 g KI and 450 ml DMF were added sequentially to a 1000 ml four mouth flask. The mixture was stirred and heated to 85° C. and incubated for 40 minutes. 20.7 g K$_2$CO$_3$ (150 mmol) was then added. The mixture was heated to 98° C., then 12.7 g (100 mmol) 1,4-dichlorobutane was added at once and incubated for 4 hours. The mixture was filtered, washed with water and filtrated to provide XCP-3, (34.1 g dry weight, 82.3% yield).

Example 5: Preparation of MU2951-11

Formula C$_{19}$H$_{24}$N$_8$O$_4$, molecular weight 428.4, Standard name: 7-[4-(1,3-dimethyl-2,6-dioxide-2,3,6,7-4H-1H-purine-7-yl)amyl]-1,3-dimethyl-2,3,6,7-4H-1H-purine-2,6-dione

MU2951-11

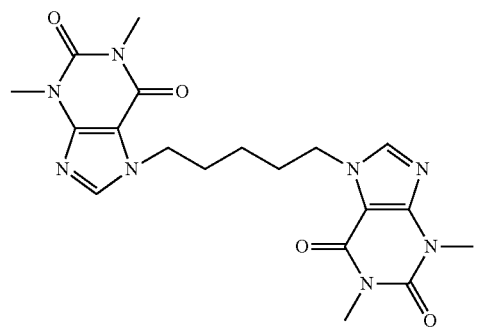

Procedure 1:

36 g theophylline (200 mmol), 1.6 g KI and 720 ml pure water were added sequentially to a 1000 ml four mouth flask. The mixture was stirred, heated to 70° C. and incubated for 60 minutes. The pH of the mixture was adjusted to pH 10 with a 30% liquid alkaline (30% sodium hydroxide in water). After achieving pH 10, the mixture was heated to 90° C., and 46.0 g (200 mmol) of 1,5-dibromopentane was added dropwise over 1 hour. The mixture was then incubated for 36 hours for pH 9-10. Then it was filtered, washed with water and filtrated to provide MU2951-11 (36.0 g dry weight, 84.0% yield).

Procedure 2:

36 g theophylline (200 mmol), 0.3 g KI and 450 ml DMF were added sequentially to a 1000 ml four mouth flask. The mixture was stirred and heated to 85° C. and incubated for 40 minutes. 20.7 g K$_2$CO$_3$ (150 mmol) was then added. The mixture was heated to 98° C. and 14.1 g (100 mmol) of 1,5-dichloropentane was added dropwise over 0.5 hours. The mixture was incubated for 4 hours, then filtered, washed with water and filtrated to provide MU2951-11 (35.8 g dry weight, 83.6% yield).

Example 6: Preparation of XCP-4

Formula C$_{20}$H$_{26}$N$_8$O$_4$, molecular weight 442.4, Standard name: 7-[4-(1,3-dimethyl-2,6-dioxide-2,3,6,7-4H-1H-purine-7-yl)hexyl]-1,3-iimethyl-2,3,6,7-4H-1H-purine-2,6-dione

XCP-4

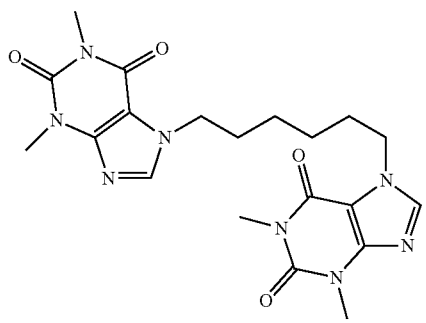

Procedure 1:

108 g theophylline (600 mmol), 3.0 g KI and 1000 ml pure water were added sequentially to a 2000 ml four mouth flask. The mixture was stirred and heated to 50° C. and incubated for 10 minutes. The pH of the mixture was adjusted to 10 with a 30% liquid alkaline. Once a pH of 10 was obtained, the mixture was heated to 60° C. 117.1 g (480 mmol) of 1,6-dibromohexane was added at once, and the mixture was incubated for 4 hours for pH 10. The mixture was filtered, washed with water and filtrated to provide XCP-4 (104.6 g dry weight, 78.9% yield).

Procedure 2:

108 g theophylline (600 mmol), 0.2 g KI, and 500 ml DMF were added sequentially to a 1000 ml four mouth flask. The mixture was stirred and heated to 60° C. and incubated for 20 minutes. 20.7 g $K_2CO_3$ (150 mmol) was added and the mixture was heated to 80° C. 18.6 g (120 mmol) of 1,6-dichlorohexane was then added dropwise over 5 hours. The mixture was incubated for 36 hours. Then mixture was then filtered, washed with water and filtrated to provide XCP-4 (39.6 g dry weight, 74.6% yield).

Example 7—General Preparation of (Alkanediyl)bis[theobromine]

A 1 mmol/10 mL concentration solution of theobromine in anhydrous DMF was prepared under an inert gas atmosphere in dry conditions. For one equivalent of theobromine, an equimolar amount of sodium hydride was carefully added, followed by one half an equivalent of dibromoalkane. The dibromoalkanes included dibromopropane, dibromobutane, and dibromooctane.

The mixture was heated to 50° C. and stirred for 15 hours. The mixture was then heated, still while stirring, to 80° C. for three hours. The progress of the reactions was monitored using TLC, by confirming the consumption of the starting materials. The resulting mixture was poured into water to produce a solid mass of the product compound. The product was further purified by column chromatography, which yielded a pure, white, amorphous compound.

Example 8: Calculation of the Instrument Constants A+B

Three samples of caffeine were subjected to a controlled temperature program as described in the table below. Each sample weighed approximately 10 mg for the experiment.

| Sample Number | Temperature | Hold Time | Heating Rate | Vapor Pressure of Caffeine |
|---|---|---|---|---|
| 1 | Ambient to 170° C. | — | 100° C./min | |
|   | Hold at 170° C. | 30 minutes | — | 64.35 Pa |
|   | Heat to 800° C. | — | 50° C./min | |
| 2 | Ambient to 200° C. | — | 100° C./min | |
|   | Hold at 200° C. | 30 minutes | — | 453.64 Pa |
|   | Heat to 800° C. | — | 50° C./min | |
| 3 | Ambient to 230° C. | — | 100° C./min | |
|   | Hold at 230° C. | 30 minutes | — | 3198.06 Pa |
|   | Heat to 800° C. | — | 50° C./min | |

The data was then plotted as a function of mass (mg) vs time (minutes). The derivative of the data during the isothermal hold period was determined for each temperature and the average value of that region was taken to be the dm/dt value. In order to determine the a and b constants, a line was fitted through the plot of the natural log of the dm/dt values versus the natural log of the vapor pressures (see table above). The a and b values are defined by the linear equation's slope and intercept, respectively.

Once the a and b values have been determined, they are valid as long as there are no modifications that would significantly affect the gas flow or temperature distribution within the furnace or sample pan of the instrument. This calibration will hold over a larger temperature range than the one used for the calibration.

Example 9: Vapor Pressure

Instrument calibration was based on samples of known vapor pressure to determine instrument specific constants a and b from the equation:

$$\ln P_T = b + a + \ln(dm/dt)_T$$

P is the vapor pressure in Pascals (1 atm=101325 Pa) at temperature T and dm/dt is the mass loss rate at temperature T. Empty pan data was gathered to determine the sensitivity range of the instrument as a function of temperature. The values for a and b were determined to be 1.2394 and 8.8337 respectively. The empty pan data is summarized in the table below:

| Temperature (° C.) | Intercept (from fit of dm/dt) | Error | Maximum P (Pa) |
|---|---|---|---|
| 120 | −1.85E−04 | 1.87E−04 | 0.012969579 |
| 180 | −1.23E−04 | 2.21E−04 | 0.673526029 |
| 240 | 1.34E−04 | 2.47E−04 | 2.609012695 |
| 280 | 7.69E−06 | 1.89E−04 | 1.349742044 |

In the table above, the maximum P is determined from the intercept value of the fit line combined with the error value. In this manner, the positive dm/dt values are identified and the proper mathematical formula is applied. The vapor pressure values are very low for the pans and that the range of the fit data would add an uncertainty of approximately 3 Pa to the results.

At 260° C., the XCP series for compounds 1-6 gave the following results, adjusted for the uncertainty above.

| Compound | Vapor Pressure at 260° C. (Pa) |
|---|---|
| XCP-1 | 1.84 ± 3 |
| XCP-2 | 2.18 ± 3 |
| XCP-3 | 1.95 ± 3 |

| Compound | Vapor Pressure at 260° C. (Pa) |
|---|---|
| XCP-4 | 7.83 ± 3 |
| XCP-5 | 0.78 ± 3 |
| XCP-6 | 4.03 ± 3 |

The vapor pressure of the materials at 260° C. is shown to be essentially zero, i.e., they are not volatile. XCP-3 was then tested in the range in which PET is dried and the following results were obtained compared to PET.

| Sample | 120° C. | 140° C. | 160° C. | 180° C. |
|---|---|---|---|---|
| PET | 0.109 ± 3 | 0.354 ± 3 | 0 ± 3 | 0.024 ± 3 |
| XCP-3 | 0.273 ± 3 | 0.075 ± 3 | 0.056 ± 3 | 0 ± 3 |

PET is shown to be essentially non-volatile over the period of 20 minutes that it takes to measure the vapor pressure, but practical experience shows that even over several hours there is minimal mass loss excluding that of water.

A measurement at 260° C. that shows low vapor pressure (i.e., less than about 25 Pa), will ensure that the material can be both processed and dried with PET.

The invention claimed is:

1. A polyester container having enhanced gas barrier properties comprising a polyester composition comprising a polyester and a gas barrier enhancing additive, wherein the gas barrier enhancing additive is a purine derivative selected from the group consisting of purine dimers, purine trimers and purine tetramers.

2. The polyester container of claim 1, wherein the polyester is selected from the group consisting of polyethylene terephthalate, polyethylene terephthalate copolymer, polyethylene naphthalate, polyethylene isophthalate, aliphatic polyesters and combinations thereof.

3. The polyester container of claim 2, wherein the polyester is polyethylene terephthalate or a polyethylene terephthalate copolymer.

4. The polyester container of claim 1, wherein the loading level of the gas barrier enhancing additive is in the range of about 0.1 to about 40 weight percent of the polyester composition.

5. The polyester container of claim 1, wherein the gas barrier enhancing additive has a molecular weight greater than about 194 g/mole.

6. The polyester container of claim 1, wherein the vapor pressure of the gas barrier enhancing additive at 260° C. is less than about 25 Pa.

7. A method for forming a hollow plastic container comprising:
 (i) providing a polyester resin material;
 (ii) heating the polyester resin material to provide a molten resin;
 (iii) adding a gas barrier enhancing additive to the molten resin, wherein the gas barrier enhancing additive is a purine derivative selected from the group consisting of purine dimers, purine trimers and purine tetramers;
 (iv) introducing the molten resin into a mold;
 (v) cooling the molten resin to form a preform;
 (vi) removing the perform from the mold; and
 (vii) blow molding the perform to form a hollow plastic container.

8. A method for forming a hollow plastic container comprising:
 (i) providing a polyester resin material comprising a polyester and a gas barrier enhancing additive, wherein the gas barrier enhancing additive is a purine derivative selected from the group consisting of purine dimers, purine trimers and purine tetramers;
 (ii) heating the polyester resin material to provide a molten resin;
 (iii) introducing the molten resin into a mold;
 (iv) cooling the molten resin to form a preform;
 (v) removing the perform from the mold; and
 (vi) blow molding the perform to form a hollow plastic container.

9. The method of claim 8, wherein the polyester is polyethylene terephthalate or a polyethylene terephthalate copolymer.

10. The method of claim 9, wherein the container is a polyethylene terephthalate bottle.

11. The polyester container of claim 1, wherein the polyester container comprises a plurality of layers.

12. The polyester container of claim 1, wherein the polyester container exhibits increased shelf-life from about 1.0 times to about 2.0 times relative to a standard polyester container.

13. The polyester container of claim 1, wherein oxygen permeation is reduced greater than about 10% relative to a standard polyester container.

14. The polyester container of claim 1, wherein carbon dioxide permeation is reduced greater than about 10% relative to a standard polyester container.

15. The method of claim 9, wherein the container is a polyethylene terephthalate copolymer bottle.

* * * * *